(12) United States Patent
Di et al.

(10) Patent No.: US 12,175,791 B2
(45) Date of Patent: Dec. 24, 2024

(54) FINGERPRINT RECOGNITION METHOD AND ELECTRONIC DEVICE

(71) Applicant: Honor Device Co., Ltd., Shenzhen (CN)

(72) Inventors: Haoxuan Di, Shenzhen (CN); Danhong Li, Beijing (CN); Xiaowu Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/029,799

(22) PCT Filed: Feb. 9, 2022

(86) PCT No.: PCT/CN2022/075709
§ 371 (c)(1),
(2) Date: Mar. 31, 2023

(87) PCT Pub. No.: WO2022/206177
PCT Pub. Date: Oct. 6, 2022

(65) Prior Publication Data
US 2024/0005695 A1    Jan. 4, 2024

(30) Foreign Application Priority Data
Apr. 2, 2021   (CN) .......................... 20110363678.6

(51) Int. Cl.
*G06V 40/12* (2022.01)
*G06Q 20/40* (2012.01)
(Continued)

(52) U.S. Cl.
CPC ... *G06V 40/1376* (2022.01); *G06Q 20/40145* (2013.01); *G06V 10/454* (2022.01);
(Continued)

(58) Field of Classification Search
CPC ....... G06V 40/12–1394; G06V 10/454; G06V 10/774; G06V 10/80; G06V 40/13;
(Continued)

(56) References Cited

U.S. PATENT DOCUMENTS

| 10,706,254 B2 | 7/2020 | Ding et al. |
| 2007/0008066 A1* | 1/2007 | Fukuda ................. G06V 40/13 340/5.52 |

(Continued)

FOREIGN PATENT DOCUMENTS

| CN | 106164933 A | 11/2016 |
| CN | 106940598 A | 7/2017 |

(Continued)

*Primary Examiner* — Roberto W Flores
(74) *Attorney, Agent, or Firm* — Slater Matsil, LLP

(57) ABSTRACT

A fingerprint recognition method and an electronic device. The electronic device includes a touch screen and a fingerprint sensor. The electronic device displays a first interface and captures first fingerprint information that is input by a user at the first interface. The electronic device determines whether the touch screen is in a first state, and the first state is used to indicate that the touch screen is in a screen protector state. If the touch screen is in the first state, the electronic device restores the first fingerprint information by using a first preset artificial intelligence (AI) restoration model to obtain second fingerprint information. The electronic device determines that the second fingerprint information matches preset fingerprint information and displays a second interface. Quality of a fingerprint image in the second fingerprint information is higher than quality of a fingerprint image in the first fingerprint information.

17 Claims, 19 Drawing Sheets

(51) Int. Cl.
  *G06V 10/44*    (2022.01)
  *G06V 10/774*   (2022.01)
  *G06V 10/80*    (2022.01)
  *G06V 40/13*    (2022.01)

(52) U.S. Cl.
  CPC ............ *G06V 10/774* (2022.01); *G06V 10/80* (2022.01); *G06V 40/13* (2022.01)

(58) Field of Classification Search
  CPC .. G06V 10/82; G06V 10/70; G06Q 20/40145; G06N 3/045; G06N 3/08; G06F 18/214
  See application file for complete search history.

(56) References Cited

U.S. PATENT DOCUMENTS

| | | | |
|---|---|---|---|
| 2020/0218875 A1 | 7/2020 | Wen | |
| 2020/0264756 A1 | 8/2020 | Jin et al. | |
| 2021/0019018 A1* | 1/2021 | Guo | ............ H10N 30/05 |
| 2021/0142026 A1 | 5/2021 | Hao et al. | |
| 2021/0278926 A1* | 9/2021 | Akhbari | ................ G06F 3/0436 |
| 2022/0043895 A1* | 2/2022 | Nakazaki | .............. G06F 18/256 |
| 2022/0058357 A1* | 2/2022 | Xu | ..................... G06V 40/1306 |
| 2022/0130016 A1* | 4/2022 | Chen | ..................... G06V 10/30 |

FOREIGN PATENT DOCUMENTS

| | | |
|---|---|---|
| CN | 107122761 A | 9/2017 |
| CN | 107256383 A | 10/2017 |
| CN | 109522885 A | 3/2019 |
| CN | 109711308 A | 5/2019 |
| CN | 110399852 A | 11/2019 |
| CN | 111191642 A | 5/2020 |
| CN | 111524480 A | 8/2020 |
| CN | 111710029 A | 9/2020 |
| CN | 111985391 A | 11/2020 |
| CN | 112257571 A | 1/2021 |
| CN | 108121946 B | 8/2021 |
| CN | 109858418 B | 10/2021 |
| CN | 113723167 A | 11/2021 |
| JP | 2012088918 A | 5/2012 |
| WO | 2020186415 A1 | 9/2020 |

* cited by examiner

FINGERPRINT RECOGNITION METHOD AND ELECTRONIC DEVICE

CROSS-REFERENCE TO RELATED APPLICATIONS

This application is a national stage of International Application No. PCT/CN2022/075709 filed on Feb. 9, 2022, which claims priority to Chinese Patent Application No. 202110363678.6 filed on Apr. 2, 2021. The disclosures of both of the aforementioned applications are hereby incorporated by reference in their entireties.

TECHNICAL FIELD

Embodiments of the present application relate to the technical fields of fingerprint recognition and artificial intelligence (artificial intelligence, AI), and more particularly, to a fingerprint recognition method and an electronic device.

BACKGROUND

As a new technical breakthrough caused by the evolution of touch screens, in-screen fingerprints are gradually applied to electronic devices (for example, mobile phones). With regard to the in-screen fingerprint, a fingerprint sensor is integrated under a touch screen of an electronic device, and the fingerprint sensor may capture fingerprint information of a user in response to a touch operation of the user in a preset position on the touch screen. The fingerprint information may be used for fingerprint recognition in a scenario such as payment or unlock.

A success rate of in-screen fingerprint recognition depends to a large extent on quality of a fingerprint image in the fingerprint information captured by the fingerprint sensor. Higher quality of the fingerprint image in the fingerprint information captured by the fingerprint sensor indicates a higher success rate of user identity verification by using the fingerprint information (that is, in-screen fingerprint recognition). The quality of the fingerprint image in the fingerprint information captured by the fingerprint sensor may be affected by a degree of fitting a user finger to the touch screen, a degree of accuracy of touching a position by a user, and the like.

There are, certainly, other factors that may affect the quality of the fingerprint image in the fingerprint information captured by the fingerprint sensor. For example, to protect a touch screen, a user often applies a film, such as a tempered film or a hydrogel film, to an electronic device (for example, a mobile phone). Applying a film to the electronic device undoubtedly increases a distance between the fingerprint sensor disposed under the touch screen and a user finger, thereby affecting the quality of the fingerprint image in the fingerprint information captured by the fingerprint sensor, and further reducing the success rate of the in-screen fingerprint recognition.

SUMMARY

The present application provides a fingerprint recognition method and an electronic device, which can increase a success rate of in-screen fingerprint recognition.

According to a first aspect, the present application provides a fingerprint recognition method, which can be applied to an electronic device including a touch screen, and the electronic device further includes a fingerprint sensor. In the method, the electronic device may display a first interface, and the electronic device may capture first fingerprint information that is input by a user at the first interface. Thereafter, the electronic device may determine whether the touch screen is in a first state. The first state is used to indicate that the touch screen is in a screen protector state. If the touch screen is in the first state, the electronic device may restore the first fingerprint information by using a first preset AI restoration model to obtain second fingerprint information. Quality of a fingerprint image in the second fingerprint information is higher than quality of a fingerprint image in the first fingerprint information. Finally, the electronic device determines that the second fingerprint information matches preset fingerprint information and displays a second interface.

The first preset AI restoration model is capable of restoring a fingerprint image to improve image quality. The first preset AI restoration model may be pre-configured on the electronic device. For example, alternatively, the quality of the fingerprint image may be indicated by sharpness and completeness of the fingerprint image. A sharper fingerprint image indicates higher quality of the fingerprint image. A more complete fingerprint image indicates higher quality of the fingerprint image.

In the present application, if the touch screen is in the first state, the electronic device may perform fingerprint image restoration on the fingerprint image captured by the fingerprint sensor, to reduce impact of the screen protector on fingerprint recognition. Then, the electronic device performs fingerprint recognition on a restored fingerprint image. In this way, the success rate of the in-screen fingerprint recognition can be increased.

In a possible design of the first aspect, before the electronic device determines whether the touch screen is in the first state, the method in the present application may further include the following steps: The electronic device determines that the first fingerprint information does not match the preset fingerprint information. The electronic device displays a third interface. The third interface includes prompt information indicating a fingerprint recognition failure.

In other words, the electronic device may determine whether the touch screen is in the first state if the first fingerprint information does not pass fingerprint recognition. It should be understood that if the first fingerprint information does not pass fingerprint recognition, a reason may be that the image quality of the fingerprint information captured by the fingerprint sensor is affected due to the touch screen protector. In this way, the electronic device may use the first preset AI restoration model to restore the first fingerprint information to obtain the second fingerprint information with high image quality, and then perform fingerprint recognition on the second fingerprint information. In this way, the success rate of the in-screen fingerprint recognition can be increased.

In another possible design of the first aspect, after the electronic device determines whether the touch screen is in the first state, the method in the present application may further include the following steps: If the touch screen is in a second state, the electronic device restores the first fingerprint information by using a second preset AI restoration model to obtain third fingerprint information. The electronic device determines that the third fingerprint information matches the preset fingerprint information and displays the second interface. The second state is used to indicate that the touch screen is in a bare screen state. Quality of a fingerprint image in the third fingerprint information is higher than the quality of the fingerprint image in the first fingerprint information. The first preset AI restoration model is different from the second preset AI restoration model.

In this design, if the fingerprint recognition is not passed, the electronic device may use different AI restoration models to restore fingerprint images captured by the fingerprint sensor when the touch screen is in different states (such as a screen protector state or a bare screen state), to improve quality of the fingerprint images. In this way, when the touch screen is in different states, quality of the fingerprint images can be improved accordingly, so that the success rate of fingerprint recognition can be increased.

In a possible design of the first aspect, the first interface includes at least one of the following interfaces: an interface in which the electronic device is in a lock screen state, a fingerprint payment interface of the electronic device, and a fingerprint unlocking interface for one or more functions of a first application on the electronic device. Certainly, the first interface includes, but is not limited to, the lock screen interface, the payment interface, and the fingerprint unlocking interface. The first interface may be any interface capable of receiving fingerprint information for fingerprint recognition.

In another possible design of the first aspect, that the electronic device determines whether the touch screen is in a first state may include the following steps: The electronic device obtains raw fingerprint data for the first fingerprint information and obtains preset fingerprint data. The electronic device performs feature fusion on the raw fingerprint data and the preset fingerprint data to obtain a first fusion image. The electronic device runs a preset AI recognition model with the first fusion image used as input to determine whether the touch screen is in the first state.

The raw fingerprint data may also be referred to as raw (raw) data. "Raw" can be translated as "unprocessed". To be specific, the raw fingerprint data is an unprocessed fingerprint image captured by the fingerprint sensor. The preset fingerprint data may be referred to as base (base) data. The preset fingerprint data includes noisy image data that is generated based on actual hardware parameters of the touch screen and the fingerprint sensor and that affects the success rate of fingerprint recognition. The preset fingerprint data is pre-configured on the electronic device. The preset AI recognition model is capable of determining, based on a fingerprint image, whether a corresponding touch screen is in a screen protector state. An output result of the preset AI recognition model is used to indicate whether the touch screen is in the screen protector state. The preset AI recognition model is pre-configured on the electronic device.

It should be understood that the raw fingerprint data is captured in real time by the electronic device. The raw fingerprint data includes the noisy image data that is generated based on the actual hardware parameters of the touch screen and the fingerprint sensor and that affects the success rate of fingerprint recognition. Therefore, the electronic device can perform feature fusion on the raw fingerprint data and the preset fingerprint data to reduce the noisy image data in the raw fingerprint data to obtain the first fusion image. Running the preset AI recognition model with the first fusion image used as input to determine whether the touch screen is in a screen protector state increases an accuracy rate of recognition in a screen protector state.

In another possible design of the first aspect, the method in which the electronic device performs feature fusion on the raw fingerprint data and the preset fingerprint data to obtain a first fusion image may include the following steps: The electronic device removes noisy image data from the raw fingerprint data by using the preset fingerprint data to obtain a second fusion image. The electronic device performs normalization on the second fusion image to obtain the first fusion image. Brightness uniformity of all pixels in the first fusion image is higher than brightness uniformity of all pixels in the second fusion image.

In this design, the electronic device may perform normalization on the second fusion image to improve the brightness uniformity of the fusion image. The brightness uniformity of the fingerprint image can be reflected by contrast of the fingerprint image. Stronger contrast of the fingerprint image indicates lower brightness uniformity of the fingerprint image. Weaker contrast of the fingerprint image indicates higher brightness uniformity of the fingerprint image. In this design, normalization can be performed on the second fusion image to reduce the contrast of the second fusion image, thereby improving the brightness uniformity of the second fusion image.

In another possible design of the first aspect, image fusion is performed on the raw fingerprint data (for example, the raw data) and the preset fingerprint data (for example, the base data), so that only part of the noisy image data in the raw fingerprint data can be removed, and some Gaussian noise cannot be removed by using image fusion. In view of this, the electronic device may perform normalization on the fusion image, and then perform Gaussian filtering on the normalized image.

Specifically, the method in which the electronic device performs feature fusion on the raw fingerprint data and the preset fingerprint data to obtain a first fusion image may include the following steps: The electronic device removes noisy image data from the raw fingerprint data by using the preset fingerprint data to obtain a second fusion image. The electronic device performs normalization on the second fusion image to obtain a third fusion image. Brightness uniformity of all pixels in the third fusion image is higher than brightness uniformity of all pixels in the second fusion image. The electronic device performs Gaussian filtering on the third fusion image to obtain the first fusion image that does not include the Gaussian noise in the third fusion image.

The part of noisy image data in the raw fingerprint data can be removed by normalization, and the Gaussian noise in the raw fingerprint data can be removed by Gaussian filtering.

In another possible design of the first aspect, the preset AI recognition model is a convolutional neural network (convolutional neural network, CNN) model or a residual neural network (residual neural network, ResNet) model.

In another possible design of the first aspect, the method in which the electronic device restores the first fingerprint information by using the first preset artificial intelligence AI restoration model to obtain second fingerprint information may include the following step: The electronic device runs the first preset AI restoration model with the first fingerprint information used as input to obtain the second fingerprint information.

The first preset AI restoration model is trained by using a plurality of first groups of fingerprint images as training samples. Each first group of fingerprint images includes a first fingerprint image and a second fingerprint image. The first fingerprint image is captured when the touch screen is in the first state, and the second fingerprint image is a pre-configured image obtained after the first fingerprint image is restored.

In another possible design of the first aspect, that the electronic device restores the first fingerprint information by using the second preset AI restoration model to obtain third fingerprint information includes the following step: The electronic device runs the second preset AI restoration model with the first fingerprint information used as input to obtain the third fingerprint information.

The second preset AI restoration model is trained by using a plurality of second groups of fingerprint images as training samples. Each second group of fingerprint images includes a third fingerprint image and a fourth fingerprint image. The third fingerprint image is captured when the touch screen is in the second state, and the fourth fingerprint image is a pre-configured image obtained after the third fingerprint image is restored.

It should be understood that because the orientation field image is used to represent directionality of a fingerprint ridge of the fingerprint image in the first fingerprint information, the directionality of the fingerprint ridge of the fingerprint image in the first fingerprint information can be determined by using the orientation field image, and intermittent fingerprint points in the first fingerprint information can be connected based on the directionality of the fingerprint ridge of the fingerprint image in the first fingerprint information. Thus, the third fingerprint information whose image quality is higher than image quality of the first fingerprint information can be obtained.

It should be noted that the first preset AI restoration model and the second preset AI restoration model are trained by using different training samples. Specifically, the first preset AI restoration model is trained by using the plurality of first groups of fingerprint images as training samples, while the second preset AI restoration model is trained by using the plurality of second groups of fingerprint images as training samples. Each first group of fingerprint images includes a first fingerprint image captured by the fingerprint sensor when the touch screen is in the screen protector state, and a second fingerprint image obtained by restoring the first fingerprint image. Each second group of fingerprint images includes a third fingerprint image captured by the fingerprint sensor when the touch screen is in the bare screen state, and a fourth fingerprint image obtained by restoring the third fingerprint image.

In other words, the first preset AI restoration model is trained by using the fingerprint images captured by the fingerprint sensor when the touch screen is in the screen protector state, while the second preset AI restoration model is trained by using the fingerprint images captured by the fingerprint sensor when the touch screen is in the bare screen state. Therefore, the first preset AI restoration model has a better effect of restoring a fingerprint image captured in the screen protector state, while the second preset AI model has a better effect of restoring a fingerprint image captured in the bare screen state.

In another possible design of the first aspect, the first preset AI restoration model may be a fully convolutional network (fully convolutional network, FCN) model.

In another possible design of the first aspect, the first preset AI restoration model may be a Unet model.

In another possible design of the first aspect, the first preset AI restoration model may be a Garbor filter. The Garbor filter is capable of extracting an orientation field image from the first fingerprint information, and restoring the first fingerprint information with the orientation field image to obtain the second fingerprint information. The orientation field image is used to represent directionality of a fingerprint ridge of the fingerprint image in the first fingerprint information.

It should be understood that because the orientation field image is used to represent directionality of a fingerprint ridge of the fingerprint image in the first fingerprint information, the directionality of the fingerprint ridge of the fingerprint image in the first fingerprint information can be determined by using the orientation field image, and intermittent fingerprint points in the first fingerprint information can be connected based on the directionality of the fingerprint ridge of the fingerprint image in the first fingerprint information. Thus, the second fingerprint information whose image quality is higher than image quality of the first fingerprint information can be obtained.

In another possible design of the first aspect, the second preset AI restoration model may be an FCN model.

In another possible design of the first aspect, the second preset AI restoration model may be a Unet model.

In another possible design of the first aspect, the second preset AI restoration model may be Garbor filtering. The Garbor filter is capable of extracting an orientation field image from the first fingerprint information, and restoring the first fingerprint information with the orientation field image to obtain third fingerprint information. The orientation field image is used to represent directionality of a fingerprint ridge of the fingerprint image in the first fingerprint information.

In a second aspect, the present application provides an electronic device including a touch screen, a memory, and one or more processors, and the electronic device further includes a fingerprint sensor. The touch screen, the memory, and the fingerprint sensor are coupled to the processor. The memory stores computer program code. The computer program code includes computer instructions. When the computer instructions are executed by the processor, the electronic device is enabled to perform the method described in the first aspect and any possible design thereof.

In a third aspect, the present application provides an electronic device including a touch screen, a memory, and one or more processors, and the electronic device further includes a fingerprint sensor. The touch screen, the memory, and the fingerprint sensor are coupled to the processor. The memory stores computer program code, and the computer program code includes computer instructions. When the computer instructions are executed by the processor, the electronic device is enabled to perform the following steps: The touch screen displays a first interface. The fingerprint sensor captures first fingerprint information that is input by a user at the first interface. The processor determines whether the touch screen is in a first state, and the first state is used to indicate that the touch screen is in a screen protector state. If the touch screen is in the first state, the processor restores the first fingerprint information by using a first preset AI restoration model to obtain second fingerprint information. Quality of a fingerprint image in the second fingerprint information is higher than quality of a fingerprint image in the first fingerprint information. The processor determines that the second fingerprint information matches preset fingerprint information and displays a second interface.

In a possible design of the third aspect, when the computer instructions are executed by the processor, the electronic device is further enabled to perform the following steps: Before the processor determines whether the touch screen is in the first state, the processor determines that the first fingerprint information does not match the preset fingerprint information; and the touch screen displays a third interface. The third interface includes prompt information indicating a fingerprint recognition failure.

In another possible design of the third aspect, when the computer instructions are executed by the processor, the electronic device is further enabled to perform the following steps: After the processor determines whether the touch screen is in the first state, if the touch screen is in a second state, the processor restores the first fingerprint information by using a second preset AI restoration model to obtain third fingerprint information. The second state is used to indicate that the touch screen is in a bare screen state. Quality of a fingerprint image in the third fingerprint information is higher than the quality of the fingerprint image in the first fingerprint information. The processor determines that the third fingerprint information matches the preset fingerprint information and displays the second interface. The first preset AI restoration model is different from the second preset AI restoration model.

In another possible design of the third aspect, the first interface includes at least one of the following interfaces: an interface in which the electronic device is in a lock screen state, a fingerprint payment interface of the electronic device, and a fingerprint unlocking interface for one or more functions of a first application on the electronic device.

In another possible design of the third aspect, when the computer instructions are executed by the processor, the electronic device is further enabled to perform the following steps: The processor obtains raw fingerprint data for the first fingerprint information and obtains preset fingerprint data. The processor performs feature fusion on the raw fingerprint data and the preset fingerprint data to obtain a first fusion image. The processor runs a preset AI recognition model with the first fusion image used as input to determine whether the touch screen is in the first state.

In another possible design of the third aspect, when the computer instructions are executed by the processor, the electronic device is further enabled to perform the following steps: The processor removes noisy image data from the raw fingerprint data by using the preset fingerprint data to obtain a second fusion image. The processor performs normalization on the second fusion image to obtain the first fusion image. Brightness uniformity of all pixels in the first fusion image is higher than brightness uniformity of all pixels in the second fusion image.

In another possible design of the third aspect, when the computer instructions are executed by the processor, the electronic device is further enabled to perform the following steps: The processor removes noisy image data from the raw fingerprint data by using the preset fingerprint data to obtain a second fusion image. The processor performs normalization on the second fusion image to obtain a third fusion image. Brightness uniformity of all pixels in the third fusion image is higher than brightness uniformity of all pixels in the second fusion image. The processor performs Gaussian filtering on the third fusion image to obtain the first fusion image that does not include Gaussian noise in the third fusion image.

In another possible design of the third aspect, the preset AI recognition model includes a CNN model or a ResNet model.

In another possible design of the third aspect, when the computer instructions are executed by the processor, the electronic device is further enabled to perform the following step: The processor runs the first preset AI restoration model with the first fingerprint information used as input to obtain the second fingerprint information. The first preset AI restoration model is trained by using a plurality of first groups of fingerprint images as training samples. Each first group of fingerprint images includes a first fingerprint image and a second fingerprint image. The first fingerprint image is captured when the touch screen is in the first state, and the second fingerprint image is a pre-configured image obtained after the first fingerprint image is restored.

In another possible design of the third aspect, the first preset AI restoration model is a fully convolutional network FCN model; or the first preset AI restoration model is a Unet model; or the first preset AI restoration model is a Garbor filter.

In another possible design of the third aspect, when the computer instructions are executed by the processor, the electronic device is further enabled to perform the following step: The processor runs the second preset AI restoration model with the first fingerprint information used as input to obtain the third fingerprint information. The second preset AI restoration model is trained by using a plurality of second groups of fingerprint images as training samples. Each second group of fingerprint images includes a third fingerprint image and a fourth fingerprint image. The third fingerprint image is captured when the touch screen is in the second state, and the fourth fingerprint image is a pre-configured image obtained after the third fingerprint image is restored.

In another possible design of the third aspect, the second preset AI restoration model is an FCN model; or the second preset AI restoration model is a Unet model; or the second preset AI restoration model is a Garbor filter.

According to a fourth aspect, the present application provides a computer storage medium. The computer storage medium includes computer instructions. When the computer instructions are run on an electronic device, the electronic device is enabled to perform the method described in any one of the first aspect and the possible designs of the first aspect.

According to a fifth aspect, the present application provides a computer program product. When the computer program product is run on a computer, the computer is enabled to perform the method described in any one of the first aspect and the possible designs of the first aspect.

It may be understood that for beneficial effects that can be achieved by the electronic devices according to any one of the second aspect, the possible designs of the second aspect, the third aspect, and the possible designs of the third aspect, by the computer storage medium according to the fourth aspect, and by the computer program product according to the fifth aspect, reference may be made to the beneficial effects according to any one of the first aspect and the possible designs of the first aspect. Details are not described herein again.

DETAILED DESCRIPTION OF ILLUSTRATIVE EMBODIMENTS

Figure 1:
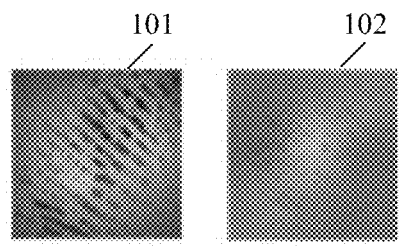
FIG. 1 is a schematic diagram of fingerprint images captured by a mobile phone in a screen protector state and in a bare screen state according to an embodiment of the present application.

The following terms "first" and "second" are merely used for description, but should not be understood as indicating or implying relative importance or implying a quantity of indicated technical features. Therefore, a feature limited by "first" or "second" may explicitly or implicitly include one or more features. In the description of embodiments, unless otherwise stated, "a plurality of" means two or more.

An embodiment of the present application provides a fingerprint recognition method, which can be applied to an electronic device having an in-screen fingerprint recognition function. The electronic device includes a touch screen, and a fingerprint sensor disposed under the touch screen.

To protect a touch screen, a user often applies a film, such as a tempered film or a hydrogel film, to an electronic device (for example, a mobile phone). Applying a film to the electronic device undoubtedly increases a distance between the fingerprint sensor disposed under the touch screen and a user finger, thereby affecting quality of a fingerprint image in fingerprint information captured by the fingerprint sensor, and further reducing a success rate of in-screen fingerprint recognition.

In the embodiment of the present application, test data is used to describe impact of applying a film to the electronic device (for example, a mobile phone) on image quality of fingerprint information captured by the fingerprint sensor disposed under the touch screen, and on a success rate of in-screen fingerprint recognition.

When touch screens of five new mobile phones of the same brand and model are in five different states separately, Table 1 shows respective image quality medians of fingerprint images captured by fingerprint sensors disposed under the touch screens, and respective success rates of fingerprint unlocking. The five different states include a bare screen state, a 0.50 millimeter (mm) tempered film protector state, a 0.36 mm tempered film protector state, a 0.26 mm hydrogel film protector state, and a 0.22 mm hydrogel film protector state.

TABLE 1

| Test states | Bare screen state | 0.50 mm tempered film protector state | 0.36 mm tempered film protector state | 0.26 mm hydrogel film protector state | 0.22 mm hydrogel film protector state |
| --- | --- | --- | --- | --- | --- |
| Image quality medians | 35.17 | 22.47 | 24.69 | 24.21 | 28.67 |
| Unlocking success rate (in a low temperature scenario) | 91% | 79% | 81% | 83% | 87% |

The quality of the fingerprint image may be represented by sharpness and/or completeness of the fingerprint image. In the embodiments of the present application, sharpness and/or completeness are collectively referred to as quality parameters of a fingerprint image. Higher sharpness indicates a larger quality parameter and higher quality of the fingerprint image. Higher completeness indicates a larger quality parameter and higher quality of the fingerprint image.

When the mobile phone is in any one of the foregoing states (for example, the 0.50 mm tempered film protector state), the fingerprint sensor may capture m fingerprint images, where m is an integer equal to or greater than 2. The m fingerprint images may be different in quality. In other words, quality parameters of the m fingerprint images may be different.

When the m fingerprint images are arranged in ascending or descending order of the quality parameters, a fingerprint image queue can be obtained. If m is an odd number, the image quality median refers to a quality parameter of a fingerprint image arranged in the middle of the fingerprint image queue. If m is an even number, the image quality median refers to an average of quality parameters of two fingerprint images arranged in the middle of the fingerprint image queue.

For example, assuming that the mobile phone is in the 0.50 mm tempered film protector state, the fingerprint sensor may capture three fingerprint images: a fingerprint image 1, a fingerprint image 2, and a fingerprint image 3. A quality parameter of the fingerprint image 1 is 22.47, a quality parameter of the fingerprint image 2 is 24, and a quality parameter of the fingerprint image 3 is 22. Because 22<22.47<24, as shown in Table 1, in the 0.50 mm tempered film protector state, an image quality median of the fingerprint images is 22.47.

For another example, assuming that the mobile phone is in the 0.36 mm tempered film protector state, the fingerprint sensor may capture four fingerprint images: a fingerprint image a, a fingerprint image b, a fingerprint image c, and a fingerprint image d. A quality parameter of the fingerprint image a is 24.68, a quality parameter of the fingerprint image b is 24.62, a quality parameter of the fingerprint image c is 24.68, and a quality parameter of the fingerprint image d is 24.80. Because 24.62<24.68<24.70<24.80, as shown in Table 1, in the 0.36 mm tempered film protector state, an image quality median of the fingerprint images is (24.68+24.70)/2=49.38/2=24.69.

It should be noted that the test data shown in Table 1 is obtained by inputting a touch operation to the mobile phones in the foregoing five states by a same user in a same touch manner in a same low temperature scenario.

Based on Table 1, it can be concluded that the quality median (for example, 35.17) of the fingerprint images captured by the fingerprint sensor in the bare screen state is highest compared to those in the screen protector state; and that the success rate (for example, 91%) of fingerprint unlocking is highest in the bare screen state compared to those in the screen protector state.

For example, FIG. 1 is a schematic diagram of fingerprint images separately captured by a mobile phone under a same condition (such as a same user finger or a same pressing force) in a screen protector state and in a bare screen state. As shown in FIG. 1, a fingerprint image 101 is a fingerprint image captured by a fingerprint sensor of the mobile phone in the bare screen state; and a fingerprint image 102 is a fingerprint image captured by the fingerprint sensor of the mobile phone in the screen protector state. After the fingerprint image 101 is compared with the fingerprint image 102, it can be concluded that the fingerprint image captured by the fingerprint sensor in the bare screen state is sharper and the image quality is better than image quality in the screen protector state.

Moreover, a thinner film applied to the touch screen indicates a higher quality median of the fingerprint images captured by the fingerprint sensor in the corresponding state, and a higher success rate of fingerprint unlocking. For example, the quality median (for example, 28.67) of the fingerprint images captured by the fingerprint sensor in the 0.22 mm hydrogel film protector state is highest, and the success rate (for example, 87%) of fingerprint unlocking is highest, as compared to those in the other screen protector states.

For example, alternatively, the quality of the fingerprint image may be indicated by sharpness and completeness of the fingerprint image. A sharper fingerprint image indicates higher quality of the fingerprint image. A more complete fingerprint image indicates higher quality of the fingerprint image. That quality of a fingerprint image (for example, the fingerprint image a) is higher than quality of another fingerprint image (for example, the fingerprint image b) may include that sharpness of the fingerprint image a is higher than sharpness of the fingerprint image b, and/or that completeness of the fingerprint image a is higher than completeness of the fingerprint image b.

Certainly, ambient light intensity, ambient humidity, and a degree of wetness of a user finger also affect the quality of the fingerprint image. Currently, in-screen fingerprint can be implemented in three manners based on different technical principles: an optical in-screen fingerprint, an ultrasonic in-screen fingerprint, and a capacitive in-screen fingerprint. Due to good image quality and relatively mature technology, the optical in-screen fingerprints are widely used in various electronic devices equipped with touch screens. Because the optical in-screen fingerprint is realized by the principle of refraction and reflection of light, optical in-screen fingerprint recognition is relatively sensitive to ambient light and humidity. It should be noted that the method according to the embodiment of the present invention can be applied to an in-screen fingerprint solution realized by the foregoing implementations such as an optical in-screen fingerprint, an ultrasonic in-screen fingerprint, and a capacitive in-screen fingerprint.

Figure 2:
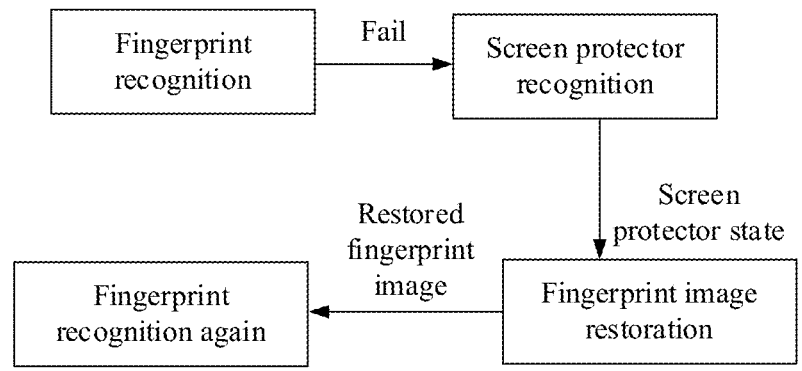
FIG. 2 is a schematic diagram of a principle of a fingerprint recognition method according to an embodiment of the present application.

Specifically, in the fingerprint recognition method provided in the embodiment of the present application, as shown in FIG. 2, if fingerprint recognition fails on the electronic device, the electronic device can identify whether the touch screen of the electronic device is in a screen protector state (that is, perform screen protector recognition). If the touch screen is in a screen protector state, the electronic device may perform fingerprint image restoration on the fingerprint image captured by the fingerprint sensor to reduce impact of the screen protector on fingerprint recognition. Then, the electronic device performs fingerprint recognition on a restored fingerprint image (fingerprint recognition again as shown in FIG. 2). In this way, the success rate of the in-screen fingerprint recognition can be increased.

For example, the electronic device in this embodiment of the present application may be a portable computer (for example, a mobile phone), a tablet computer, a notebook computer, a personal computer (personal computer, PC), a wearable electronic device (for example, a smart watch), an augmented reality (augmented reality, AR)/virtual reality (virtual reality, VR) device, a vehicle-mounted computer, or the like. A specific form of the electronic device is not specially limited in the following embodiments.

Figure 3:
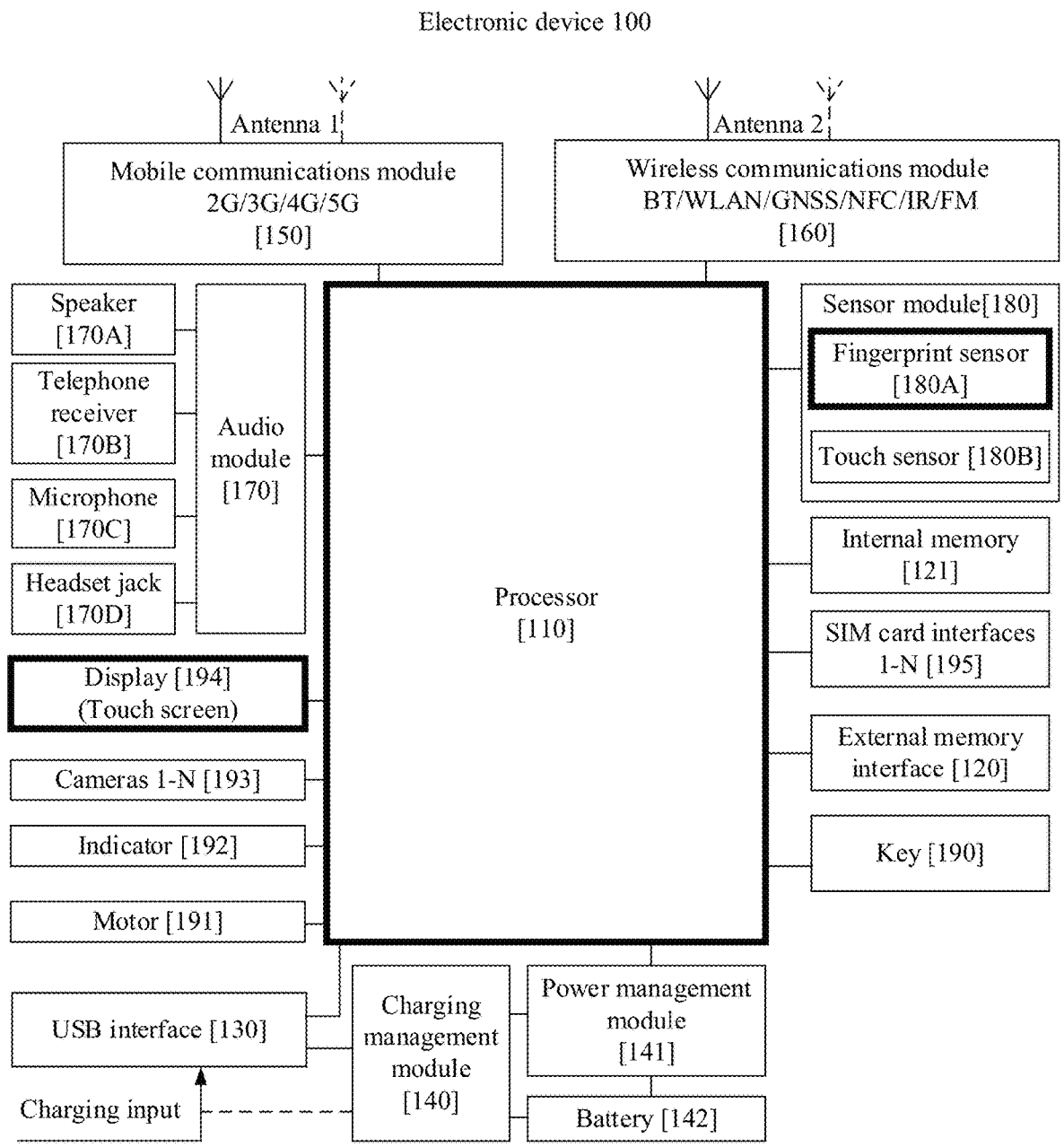
FIG. 3 is a schematic diagram of a hardware structure of an electronic device according to an embodiment of the present application.

For example, the foregoing electronic device is a mobile phone. FIG. 3 is a schematic diagram of a structure of an electronic device 100 according to an embodiment of the present application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a key 190, a motor 191, an indicator 192, a camera 193, a display 194, a subscriber identity module (subscriber identification module, SIM) card interface 195, and the like.

The sensor module 180 may include a pressure sensor, a gyro sensor, a barometric pressure sensor, a magnetic sensor, an acceleration sensor, a distance sensor, an optical proximity sensor, a fingerprint sensor 180A, a temperature sensor, a touch sensor 180B, an ambient light sensor, a bone conduction sensor, and the like.

It can be understood that the structure illustrated in this embodiment of the present invention does not constitute a specific limitation on the electronic device 100. In some other embodiments of the present application, the electronic device 100 may include more or fewer components than those shown in the figure, combine some components, split some components, or have different component arrangements. The components in the figure may be implemented by hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), a micro controller unit (micro controller unit, MCU), and/or the like. Different processing units may be separate devices or may be integrated into one or more processors.

The controller may be a nerve center and a command center of the electronic device 100. The controller may generate an operation control signal based on instruction operation code and a time sequence signal, and complete control of instruction fetching and instruction execution.

A memory may be disposed in the processor 110, and is configured to store instructions and data. In some embodiments, the memory in the processor 110 is a cache. The memory may store instructions or data that are or is just used or cyclically used by the processor 110. If the processor 110 needs to use the instructions or the data again, the processor 110 may directly invoke the instructions or the data from the memory, to avoid repeated access and reduce waiting time of the processor 110. This improves system efficiency.

In some embodiments, the processor 110 may include one or more interfaces. The interfaces may include an inter-integrated circuit (inter-integrated circuit, I2C) interface, a serial peripheral interface (serial peripheral interface, SPI), an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in embodiments of the present invention is merely an example for description, and does not constitute a limitation on a structure of the electronic device 100. In some other embodiments in the present application, the electronic device 100 may alternatively use an interface connection manner different from that in the foregoing embodiment, or use a combination of a plurality of interface connection manners.

The charging management module 140 is configured to receive charging input from a charger. The power management module 141 is configured to connect the battery 142 and the charging management module 140 to the processor 110. The power management module 141 receives input from the battery 142 and/or the charging management module 140, and supplies power to the processor 110, the internal memory 121, the external memory, the display 194, the camera 193, the wireless communications module 160, and the like. In some other embodiments, the power management module 141 and the charging management module 140 may be disposed on a same device.

A wireless communication function of the electronic device 100 may be implemented by using the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna for a wireless local area network. In some other embodiments, the antenna may be used together with a tuning switch.

The mobile communications module 150 may provide a solution to wireless communication including 2G/3G/4G/5G and the like applied to the electronic device 100. The wireless communications module 160 may provide a wireless communication solution that includes a wireless local area network (wireless local area network, WLAN) (for example, a Wi-Fi network), Bluetooth (Bluetooth, BT), a global navigation satellite system (global navigation satellite system, GNSS), frequency modulation (frequency modulation, FM), NFC, an infrared (infrared, IR) technology, and the like and that is applied to the electronic device 100.

The electronic device 100 implements a display function by using the GPU, the display 194, the application processor, and the like. The GPU is an image processing microprocessor and is connected to the display 194 and the application processor. The GPU is configured to perform mathematical and geometric calculations for graphic rendering. The processor 110 may include one or more GPUs, and the GPUs execute program instructions to generate or change display information.

The display 194 is configured to display an image, a video, or the like. The display is a touch screen. In some embodiments, the electronic device 100 may include 1 or N displays 194, where N is a positive integer greater than 1.

The electronic device 100 can implement a photographing function by using the ISP, the camera 193, the video codec, the GPU, the display 194, the application processor, and the like. The ISP is configured to process data fed back by the camera 193. The camera 193 is configured to capture a still image or a video. In some embodiments, the electronic device 100 may include 1 or N cameras 193, where N is a positive integer greater than 1. [moo] As a neural-network (neural-network, NN) computing processor, the NPU may quickly process input information by using a biological neural network structure such as a mode of transmission between human-brain nerve cells, and may further constantly perform self-learning. The NPU can implement applications such as intelligent cognition of the electronic device 100, for example, screen protector state recognition, image restoration, image recognition, facial recognition, speech recognition, and text understanding.

The external memory interface 120 may be configured to connect an external memory card, such as a micro SD card, to expand a storage capacity of the electronic device 100. The external memory card communicates with the processor 110 through the external memory interface 120, to implement a data storage function. For example, files such as music and a video are stored in the external memory card.

The internal memory 121 may be configured to store computer executable program code, and the executable program code includes instructions. The processor 110 executes various function applications and data processing of the electronic device 100 by running the instructions stored in the internal memory 121. The internal memory 121 may include a program storage area and a data storage area. The program storage region may store an operating system, an application program required by at least one function (such as a sound play function and an image display function), and the like. The data storage area may store data (such as audio data and a phone book) created during use of the electronic device 100, and the like. In addition, the internal memory 121 may include a high-speed random access memory, and may further include a non-volatile memory such as at least one magnetic disk storage component, a flash memory component, or a universal flash storage (universal flash storage, UFS).

The electronic device 100 may implement an audio function by using the audio module 170, the speaker 170A, the telephone receiver 170B, the microphone 170C, the headset jack 170D, the application processor, and the like, such as music playing and recording.

The fingerprint sensor 180A is configured to capture fingerprint information. The electronic device 100 may use fingerprint features of the captured fingerprint information for user identity verification (that is, fingerprint recognition), to implement fingerprint unlocking, application lock accessing, fingerprint photographing, fingerprint-based call answering, and the like.

Figure 4:
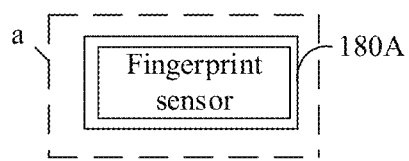
FIG. 4 is a schematic diagram of a structure example of a touch screen disposed with a fingerprint sensor according to an embodiment of the present application.

In the embodiment of the present application, the fingerprint sensor 180A may be disposed under the display 194; or the fingerprint sensor 180A may be integrated in the display 194. The fingerprint sensor 180A may be disposed in a fixed position of the display 194. For example, when the electronic device 100 is a touch-screen mobile phone, the fingerprint sensor 180A may be disposed in a position that is close to the underside of the touch-screen mobile phone and that is in the touch screen (that is, the display 194) of the touch-screen mobile phone. For example, as shown in FIG. 4, the fingerprint sensor 180A may be disposed in a position a of the display 194. Alternatively, the fingerprint sensor 180A may be disposed throughout the display 194.

The touch sensor 180B is also referred to as a "touch panel (TP)". The touch sensor 180B may be disposed on the display 194, and the touch sensor 180B and the display 194 constitute a touch screen, which is also referred to as a "touch control screen". The touch sensor 180B is configured to detect a touch operation performed on or near the touch sensor 180B. The touch sensor can transmit a detected touch operation to the application processor to determine a type of a touch event. The display 194 may be configured to provide a visual output related to the touch operation. In some other embodiments, the touch sensor 180B may be alternatively disposed on the surface of the electronic device 100 in a position different from that of the display 194.

The key 190 includes a power-on key, a volume key, and the like. The motor 191 may generate vibration alerts. The indicator 192 may be an indicator light, and may be used to indicate a charging status and a battery level, or may be used to indicate a message, a missed call, a notification, and the like. The SIM card interface 195 is configured to connect a SIM card.

Figure 5A:
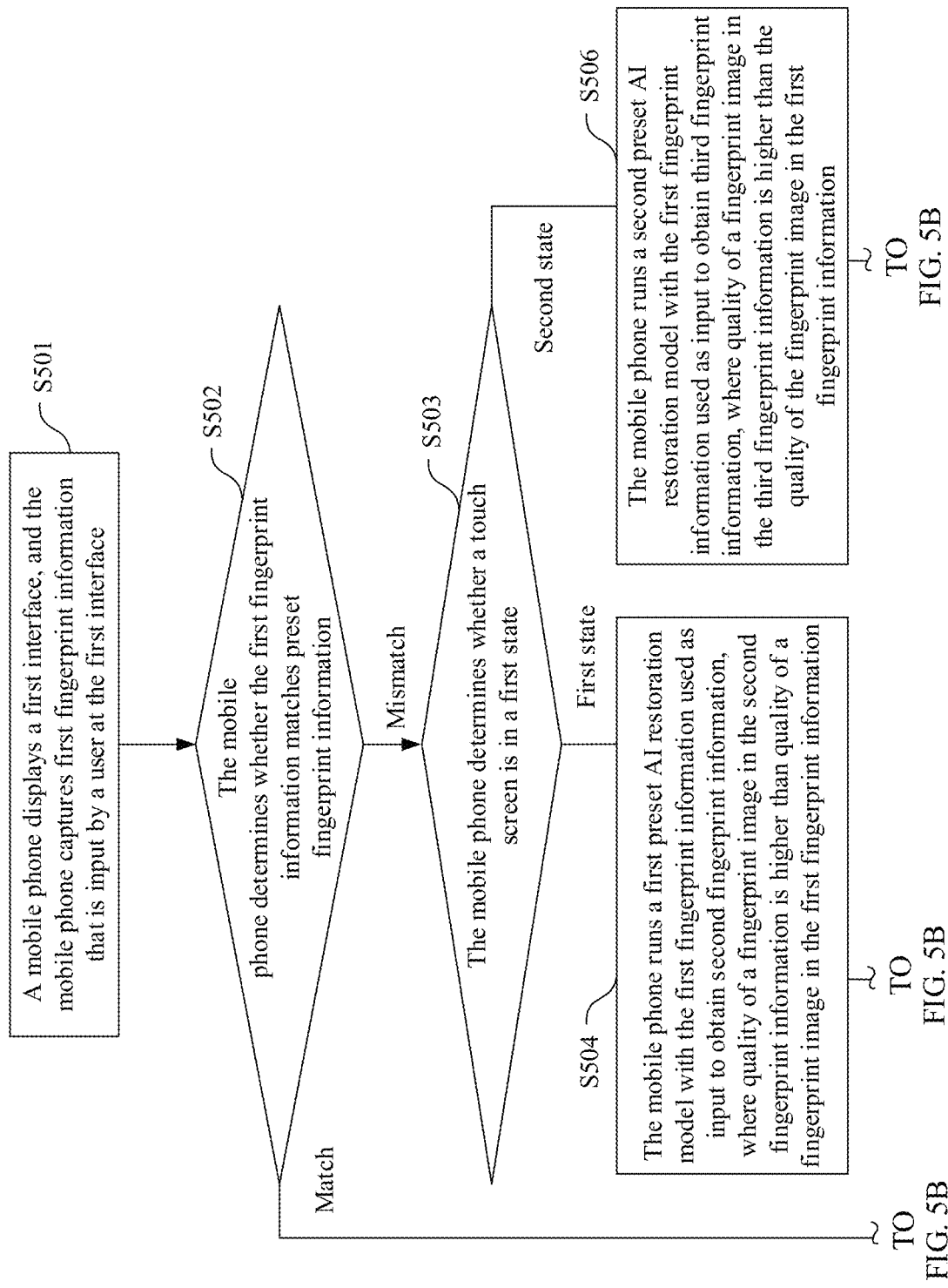
FIG. 5A and FIG. 5B are a flowchart of a fingerprint recognition method according to an embodiment of the present application.
Figure 5B:
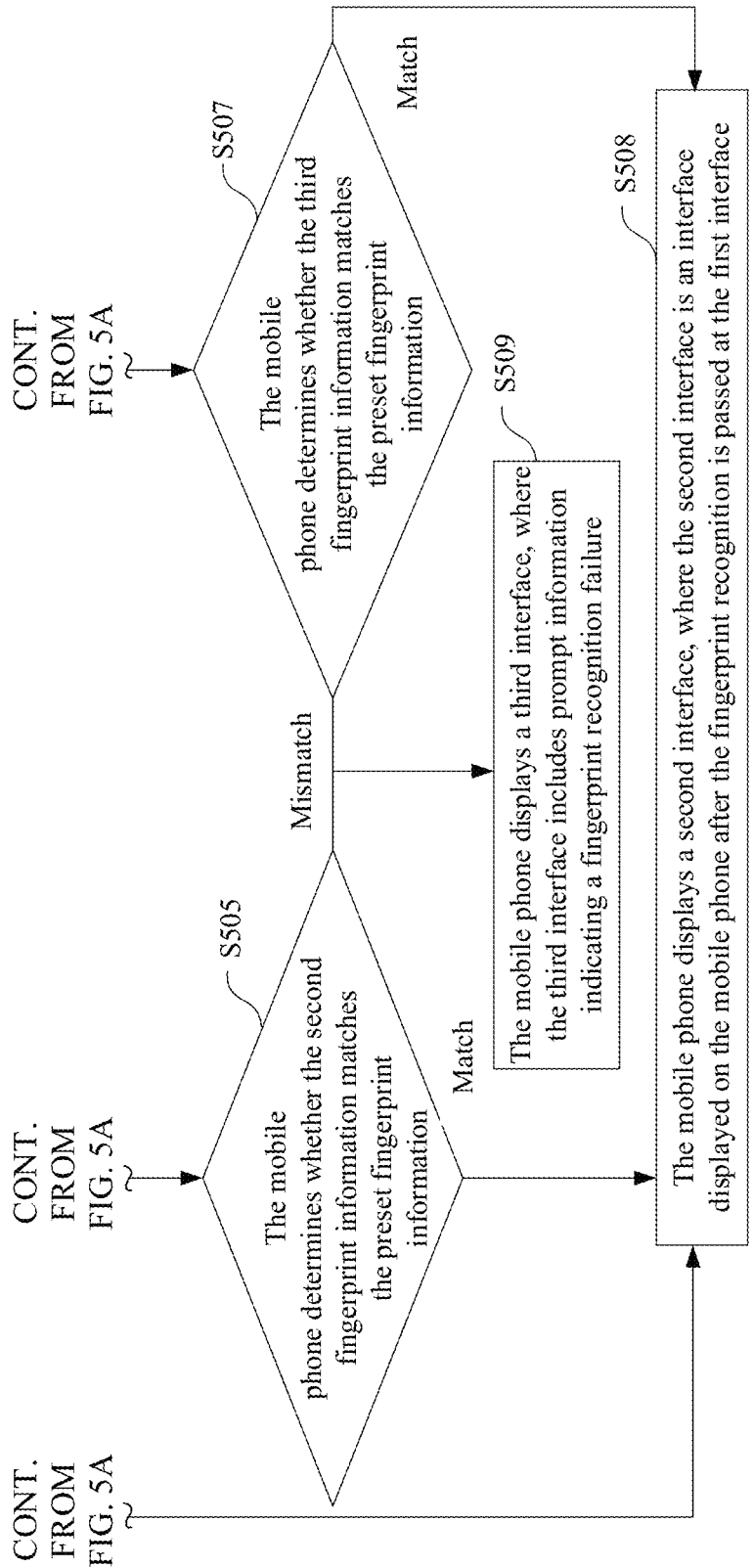

An embodiment of the present application provides a fingerprint recognition method, which can be applied to an electronic device having an in-screen fingerprint recognition function. The electronic device includes a touch screen, and a fingerprint sensor disposed under the touch screen. Based on an example in which the foregoing electronic device is a mobile phone, as shown in FIG. 5A and FIG. 5B, the fingerprint recognition method may include S501 to S509.

S501. The mobile phone displays a first interface, and the mobile phone captures first fingerprint information that is input by a user at the first interface.

The first interface may include at least one of the following interfaces: an interface in which the mobile phone is in a lock screen state, a fingerprint payment interface of the mobile phone, and a fingerprint input interface for one or more functions of a first application in the mobile phone. The first application may be an application whose one or more functions will be available only when an unlock (for example, fingerprint unlock) operation is performed. For example, the first application may be a "bank" application whose account detail page will be displayed on the mobile phone only when an unlock (for example, fingerprint unlock) operation is performed. For another example, the first application may be a "settings" application whose password modification and decryption will be displayed on the mobile phone only when an unlock (for example, fingerprint unlock) operation is performed.

In a first application scenario, the first interface is an interface in which the mobile phone is in a lock screen state. The interface in which the mobile phone is in a lock screen state may be a black screen interface of the mobile phone, or may be a lock screen interface of the mobile phone.

Figure 6A:
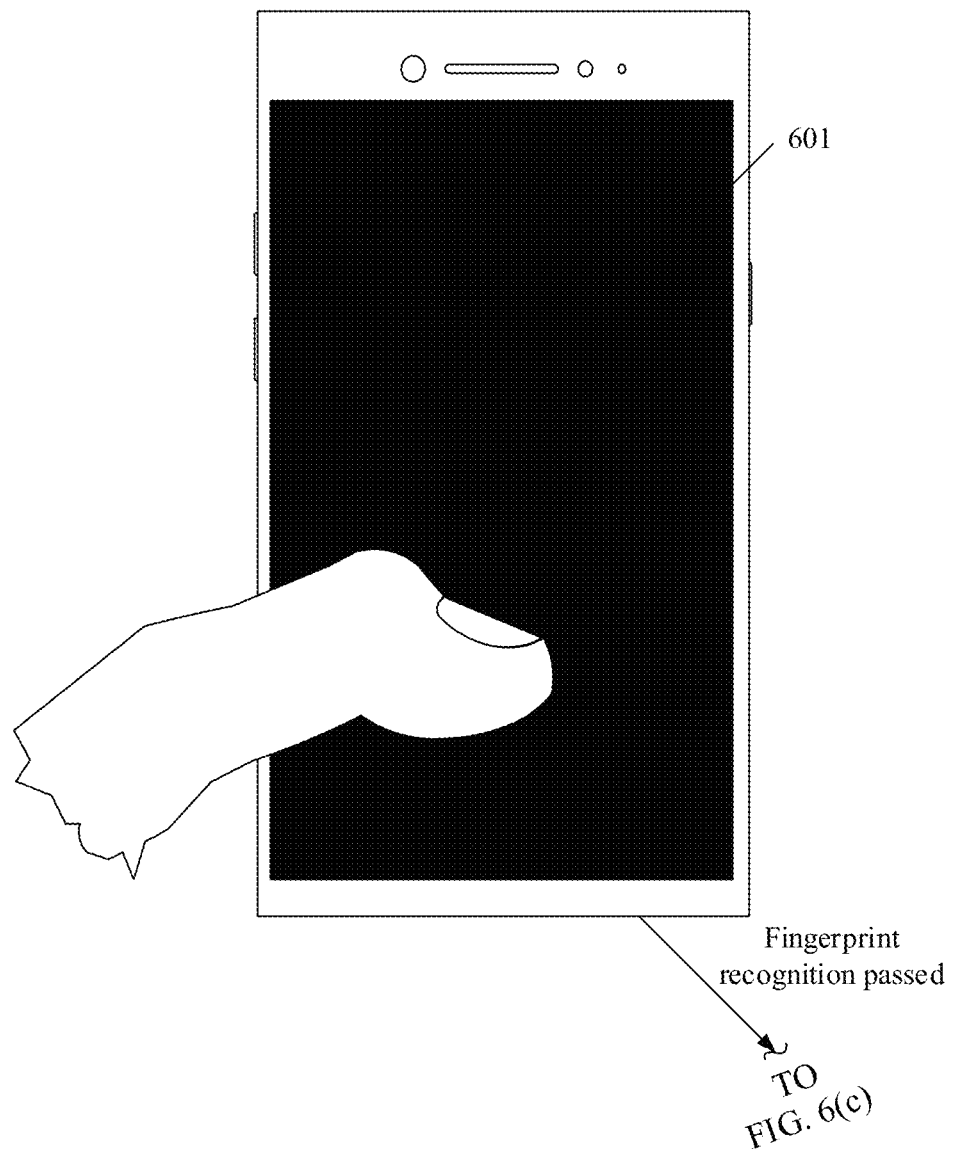
FIG. 6(a) to FIG. 6(c) are a schematic diagram of a display interface of a mobile phone in a fingerprint recognition scenario according to an embodiment of the present application.
Figure 6B:
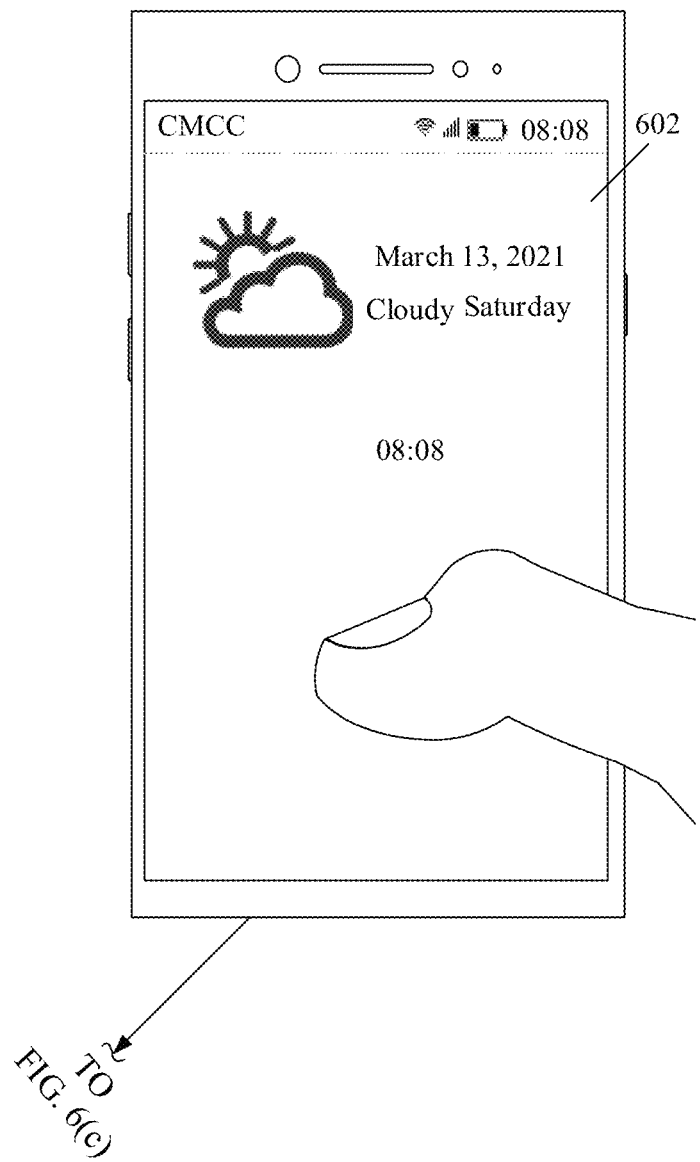

Both the black screen interface 601 shown in FIG. 6(a) and the lock screen interface 602 shown in FIG. 6(b) of the mobile phone can receive fingerprint information (captured by the fingerprint sensor) that is input by the user. The fingerprint information is used for unlocking the mobile phone. For example, after the mobile phone receives fingerprint information (for example, the first fingerprint information) that is input by the user at the black screen interface 601 or the lock screen interface 602, the mobile phone may perform S502 to determine whether the first fingerprint information matches preset fingerprint information. After S602, if the first fingerprint information passes fingerprint recognition, the mobile phone may display a main interface 603 shown in FIG. 6(c), in other words, a second interface.

It should be noted that "passing fingerprint recognition" described in the embodiment of the present application may also be referred to as "fingerprint recognition success", and "not passing fingerprint recognition" may also be referred to as "fingerprint recognition failure".

Specifically, the mobile phone may determine whether the first fingerprint information matches the preset fingerprint information. If the first fingerprint information matches the preset fingerprint information, it indicates that the first fingerprint information passes fingerprint recognition. If the first fingerprint information does not match the preset fingerprint information, the first fingerprint information does not pass fingerprint recognition. For example, if a matching degree of the first fingerprint information and the preset fingerprint information is higher than or equal to a preset matching degree threshold, it indicates that the first fingerprint information matches the preset fingerprint information. If the matching degree between the first fingerprint information and the preset fingerprint information is lower than the preset matching degree threshold, it indicates that the first fingerprint information does not match the preset fingerprint information. For example, the preset matching degree threshold may be any value such as 80%, 90%, or 85%. The preset matching degree threshold is stored on the mobile phone in advance. The preset fingerprint information is stored on the mobile phone in advance.

Figure 7A:
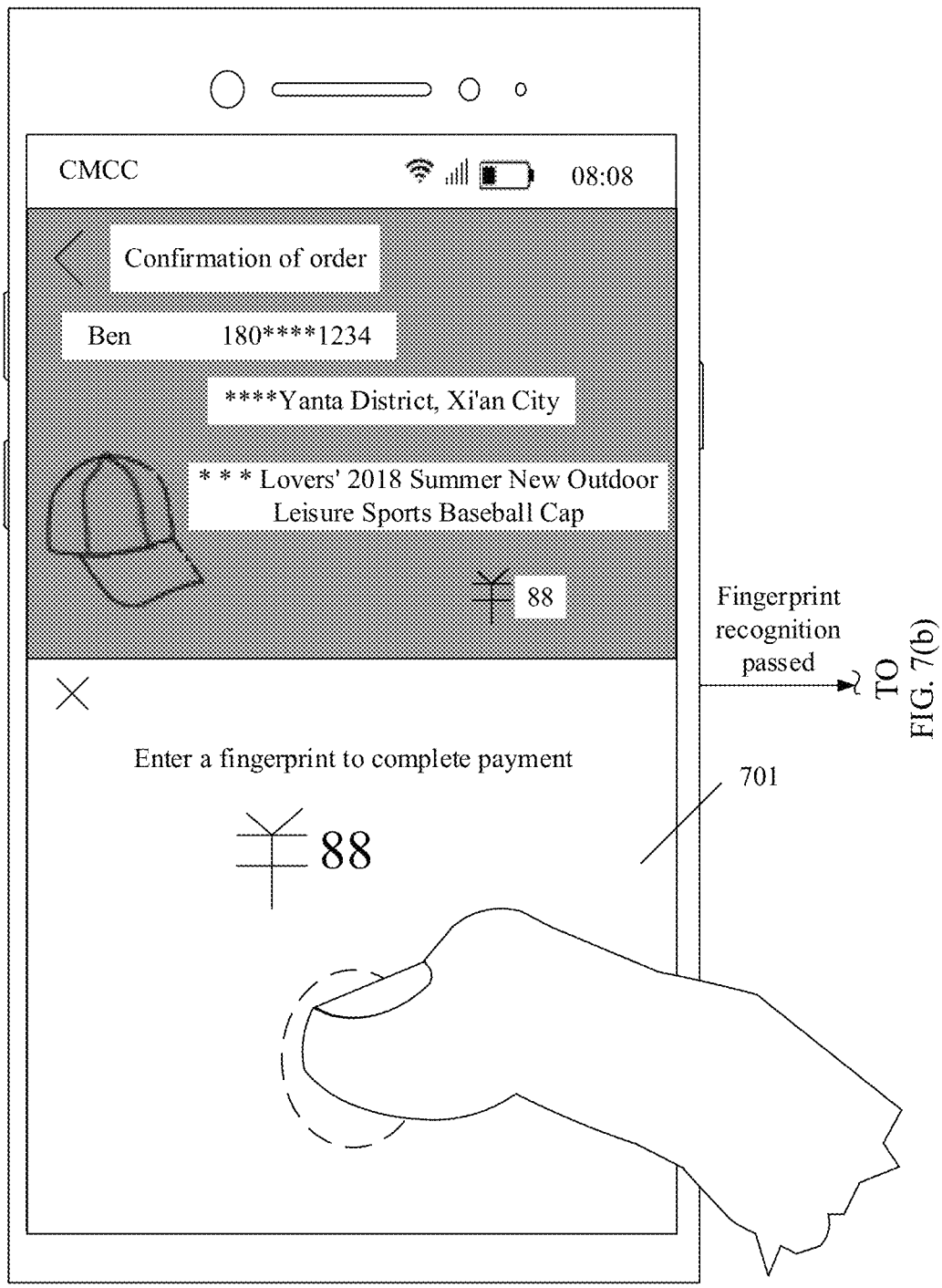
FIG. 7(a) and FIG. 7(b) are a schematic diagram of a display interface of a mobile phone in another fingerprint recognition scenario according to an embodiment of the present application.
Figure 7B:
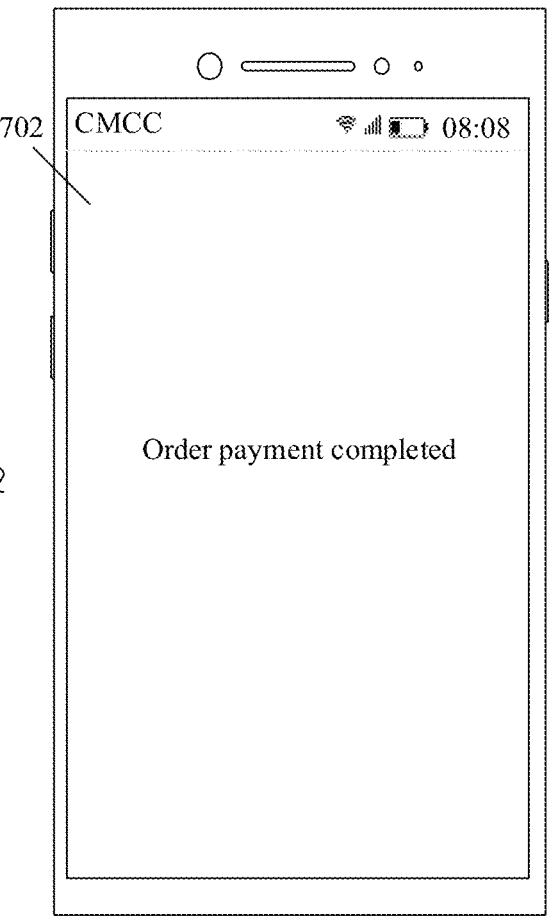

In a second application scenario, the first interface is the fingerprint payment interface of the mobile phone, such as a payment interface 701 shown in FIG. 7(a). The mobile phone may receive fingerprint information (for example, first fingerprint information) (captured by the fingerprint sensor) that is input by a user at the payment interface 701. Thereafter, the mobile phone may perform S502 to perform fingerprint recognition on the first fingerprint information. After S502, if the fingerprint recognition is passed, the mobile phone may display a payment success interface 702 shown in FIG. 7(b), in other words, a second interface.

Figure 8A:
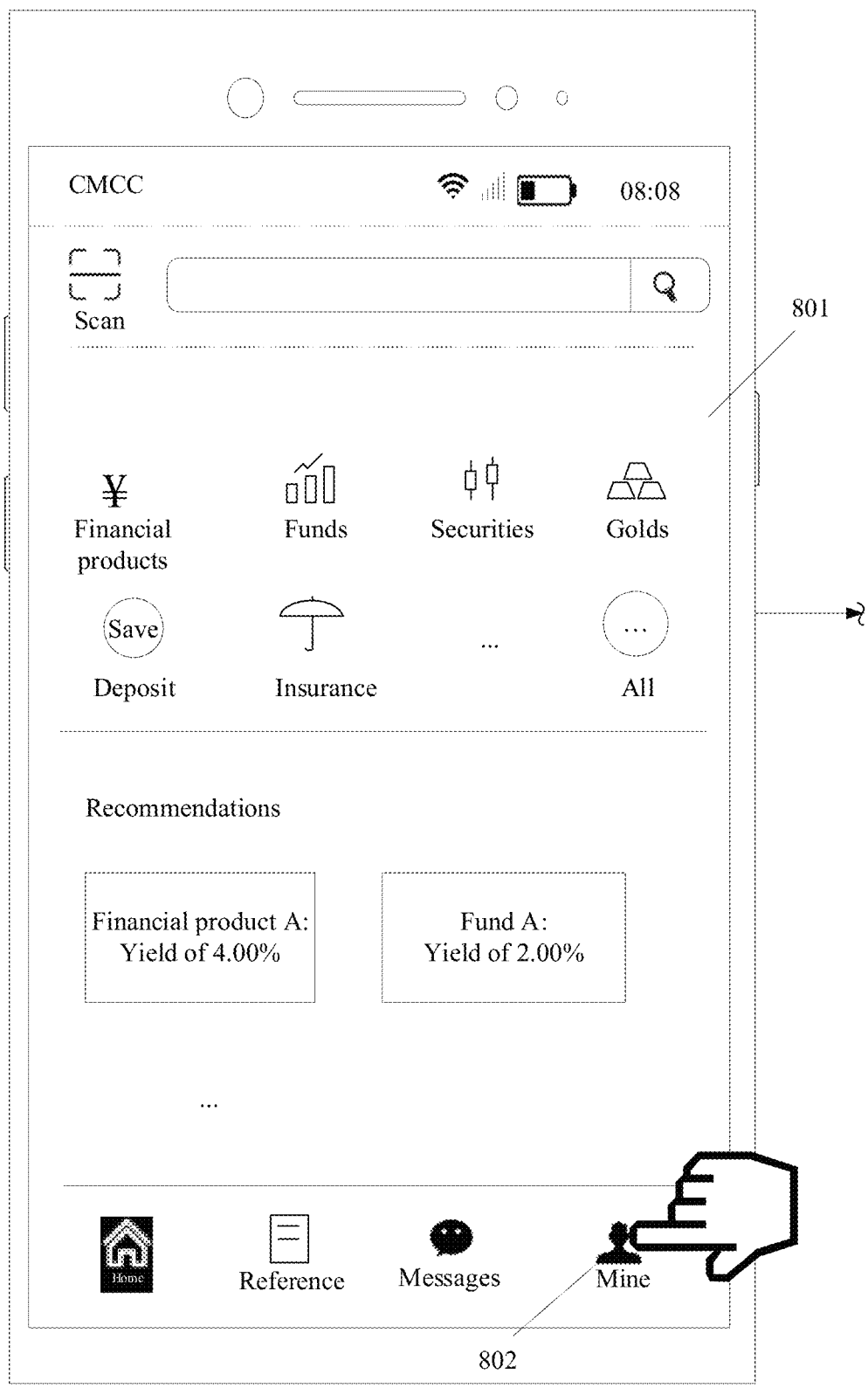
FIG. 8(a) to FIG. 8(c) are a schematic diagram of a display interface of a mobile phone in another fingerprint recognition scenario according to an embodiment of the present application.
Figure 8B:
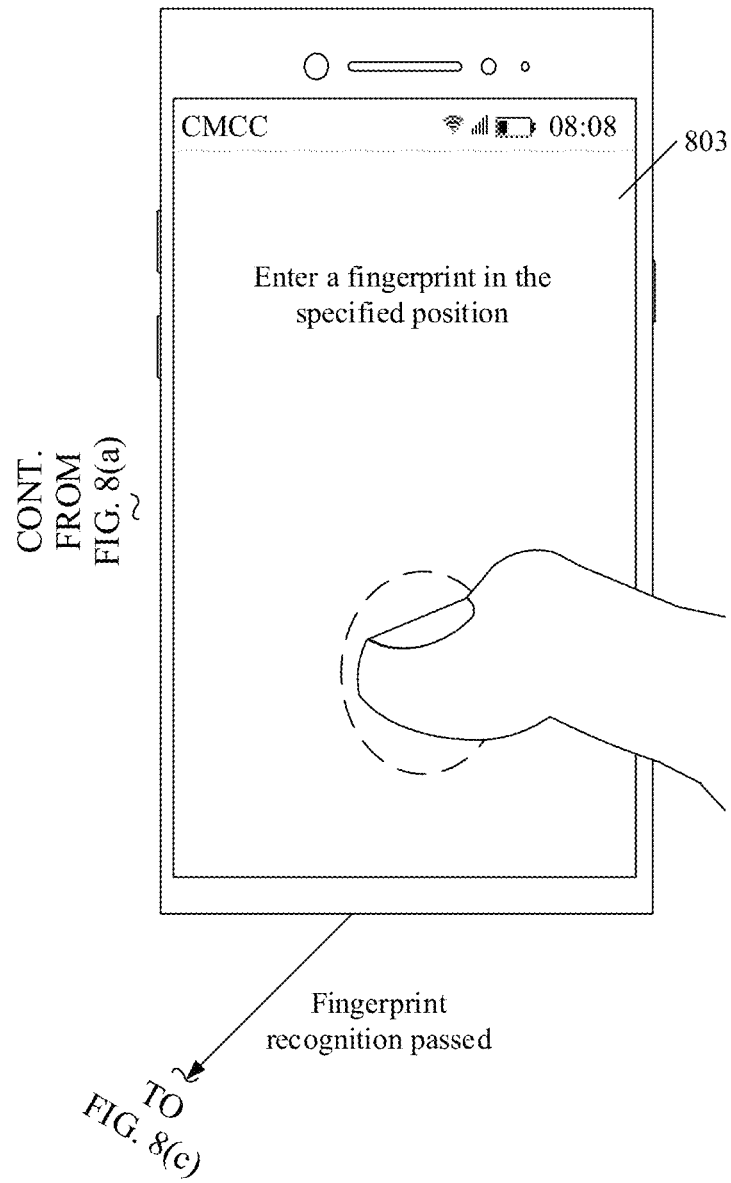
Figure 8C:
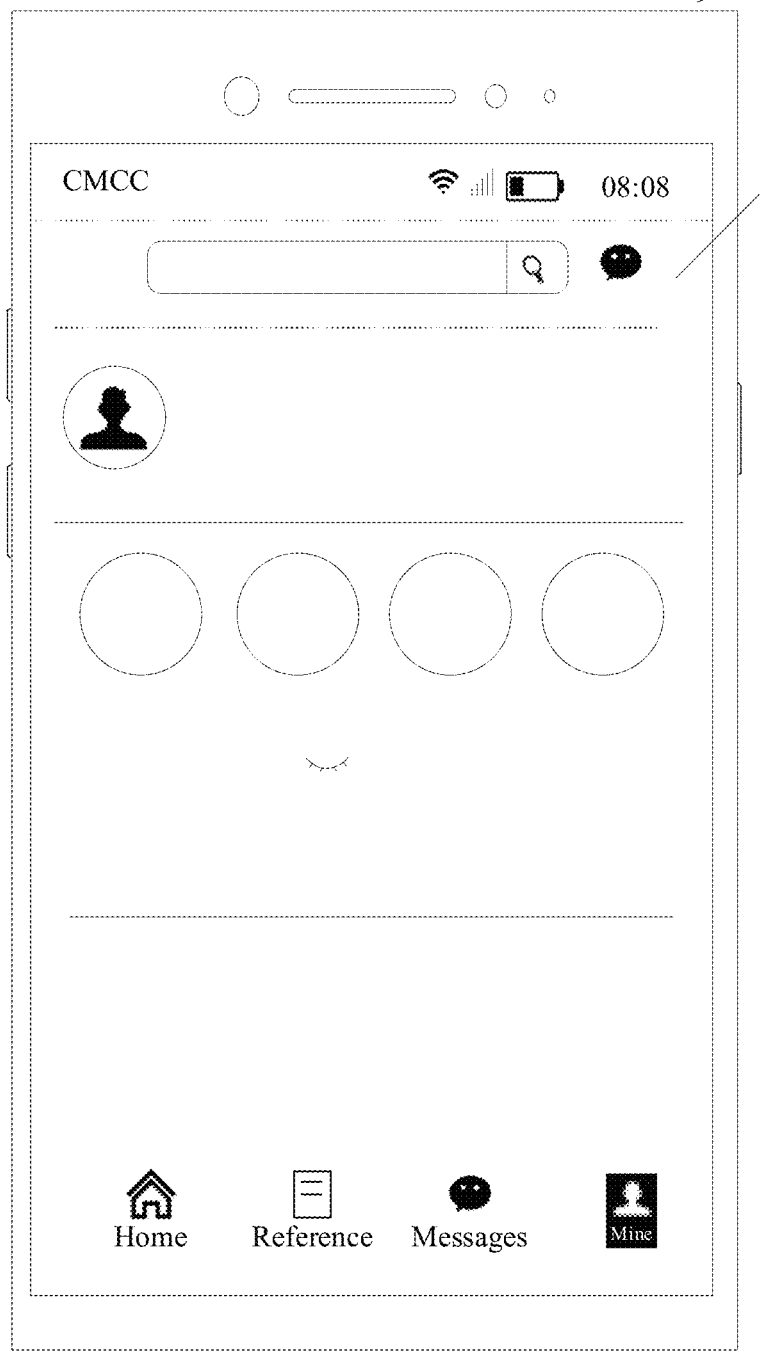

In a third application scenario, the first interface is the fingerprint input interface for one or more functions of the first application in the mobile phone. For example, the mobile phone may display a home page 801 of a "bank" application shown in FIG. 8(*a*). In response to a user click operation on the "Mine" button 802 on the home page 801 of the "bank" application, the mobile phone may display a fingerprint entry interface 803 shown in FIG. 8(*b*). The first interface may be the fingerprint entry interface 803. The mobile phone may receive fingerprint information (for example, first fingerprint information) (captured by the fingerprint sensor) that is input by the user at the fingerprint entry interface 803. Thereafter, the mobile phone may perform S502 to perform fingerprint recognition on the first fingerprint information. After S502, if the fingerprint recognition is passed, the account detail page of the "bank" application is unlocked, and the mobile phone may display an account detail page 804 of the "bank" application shown in FIG. 8(*c*), in other words, a second interface.

S502. The mobile phone determines whether the first fingerprint information matches the preset fingerprint information.

For a specific method in which the mobile phone determines whether the first fingerprint information matches the preset fingerprint information, refer to the fingerprint recognition method in the foregoing embodiment and the conventional technology. Details are not described herein again in this embodiment of the present application. In some embodiments, S502 is optional. The mobile phone may perform S503 directly after S5*oi*.

After S502, if the first fingerprint information does not pass fingerprint recognition, it indicates that the first fingerprint information does not match the preset fingerprint information for fingerprint recognition previously stored in the mobile phone, and it indicates that fingerprint recognition on the first fingerprint information fails. If the first fingerprint information does not pass fingerprint recognition, there may be three reasons: (1) the user does not input the fingerprint information using the correct finger; (2) a fingerprint pattern of the user is blurred and not easily captured; and (3) when the user inputs fingerprint information, an insufficient fitting degree between the finger and the touch screen cannot ensure that the fingerprint sensor captures fingerprint information with high fingerprint image quality. Even if the second or third reason exists, if a film is not applied to the touch screen of the mobile phone, fingerprint recognition on the fingerprint information captured by the touch sensor may succeed. Therefore, the mobile phone can restore the first fingerprint information to increase the success rate of fingerprint recognition. Specifically, after S502, if the first fingerprint information does not match the preset fingerprint information, it indicates that the first fingerprint information does not pass fingerprint recognition, and the mobile phone may perform S503. If the first fingerprint information passes fingerprint recognition, the mobile phone may perform S508.

S503. The mobile phone determines whether the touch screen is in a first state.

The first state is used to indicate that the touch screen is in a screen protector state. When the touch screen is in a screen protector state, specifically, a protective film is applied to the touch screen. When the touch screen is in a bare screen state, specifically, a protective film is not applied to the touch screen. The protective film described in the embodiments of the present application may be any protective film such as a tempered film, a hydrogel film, or a high-definition plastic film.

Figure 9A:
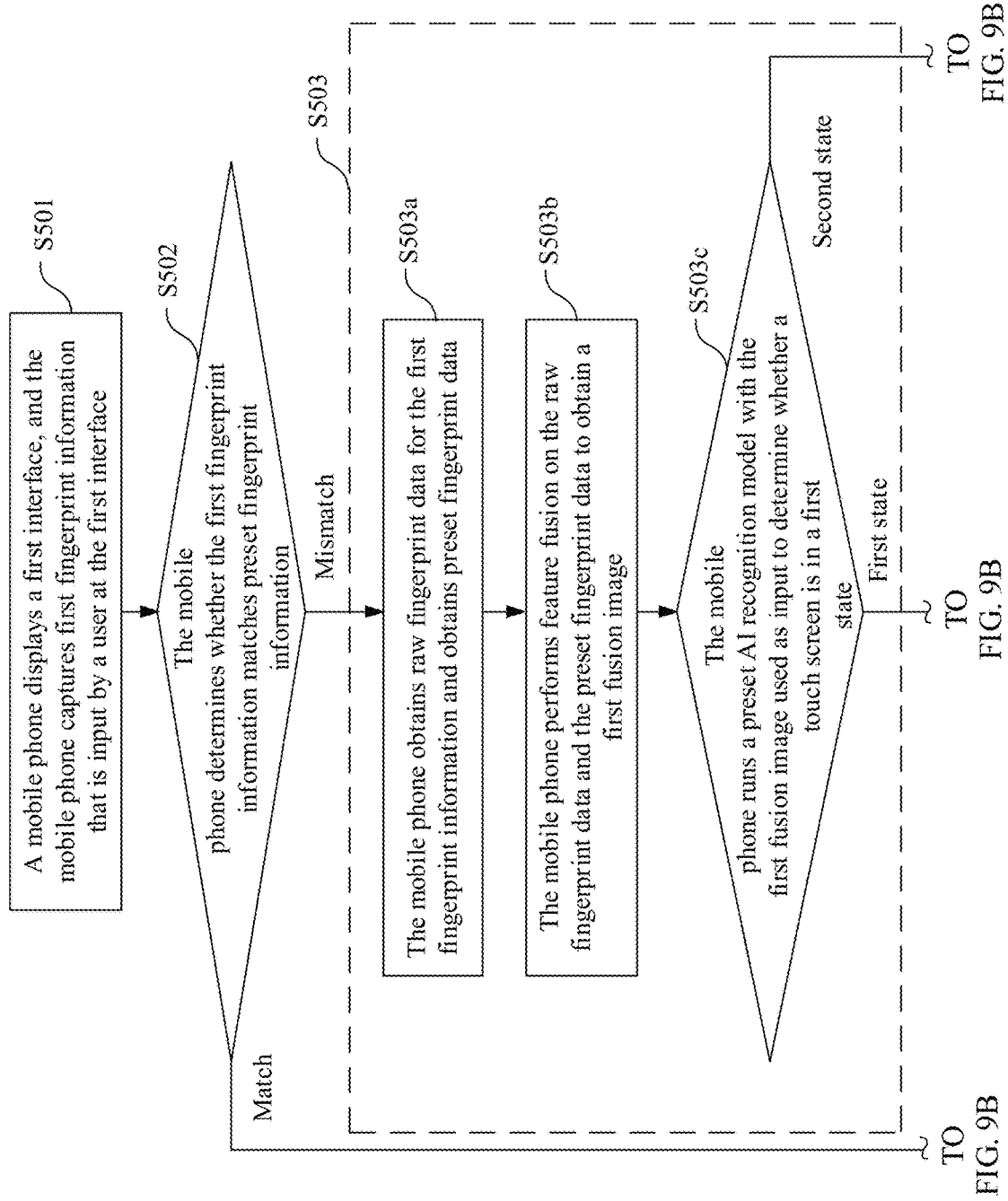
FIG. 9A and FIG. 9B are a flowchart of a fingerprint recognition method according to an embodiment of the present application.
Figure 9B:
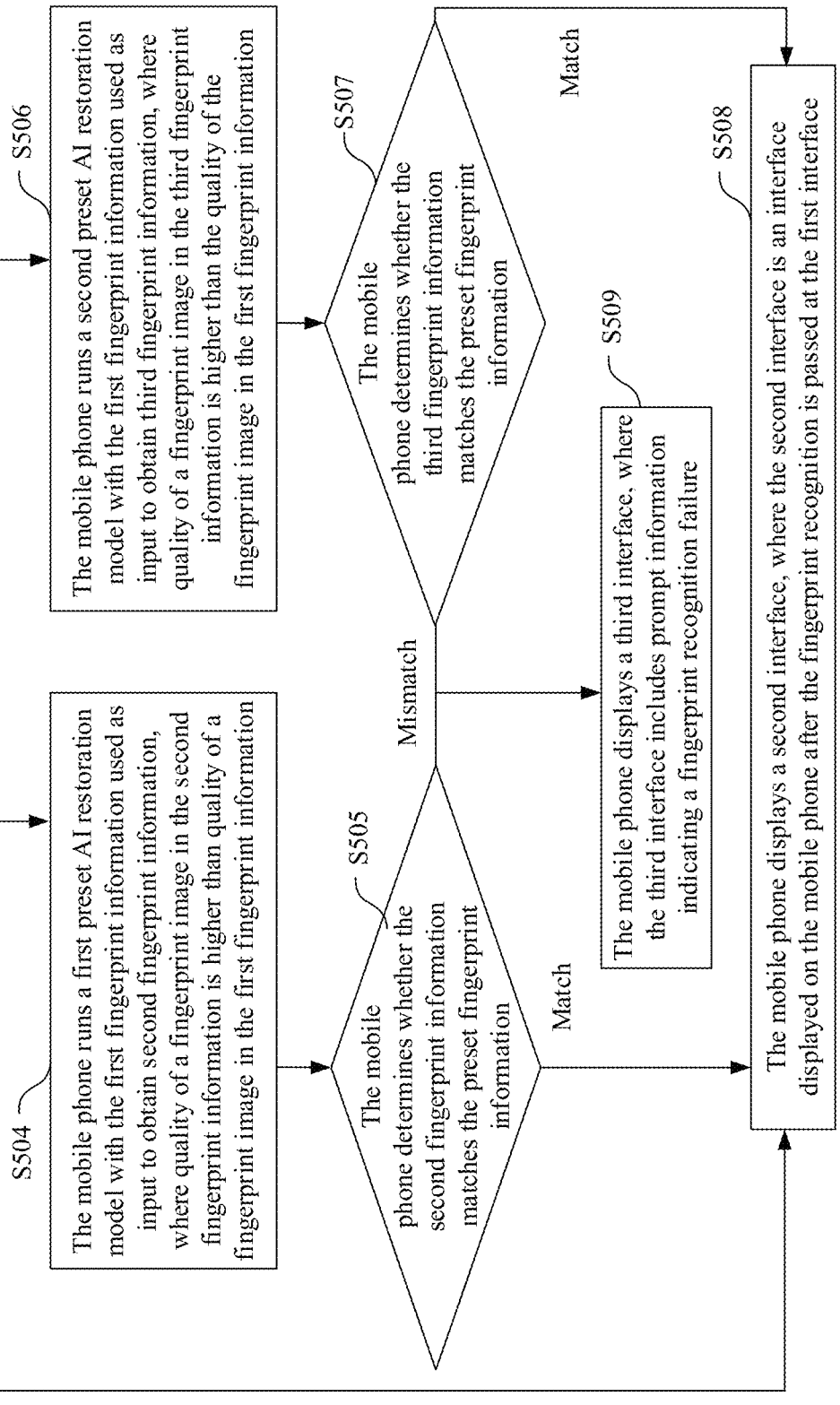

For example, a preset AI recognition model may be pre-configured on the mobile phone. The preset AI recognition model is capable of determining, based on a fingerprint image, whether a corresponding touch screen is in a screen protector state. Specifically, the method in which the mobile phone determines whether the touch screen is in a screen protector state may include S503*a* to S503*c*. For example, as shown in FIG. 9A and FIG. 9B, S503 may include S503*a* to S503*c*.

S503*a*. The mobile phone obtains raw fingerprint data for the first fingerprint information and obtains preset fingerprint data.

The raw fingerprint data may also be referred to as raw (Raw) data. "Raw" can be translated as "unprocessed". To be specific, the raw fingerprint data is an unprocessed fingerprint image captured by the fingerprint sensor.

The preset fingerprint data may be referred to as base (Base) data. The preset fingerprint data includes noisy image data that is generated based on actual hardware parameters of the touch screen and the fingerprint sensor and that affects a success rate of fingerprint recognition. For example, the preset fingerprint data may include noisy image data generated due to a lack of close fit between the touch screen and the fingerprint sensor. The preset fingerprint data may be obtained by performing a large quantity of tests on the mobile phone before delivery from factory. The preset fingerprint data is pre-configured on the mobile phone.

S503*b*. The mobile phone performs feature fusion on the raw fingerprint data and the preset fingerprint data to obtain a first fusion image.

It should be understood that the raw fingerprint data is captured in real time by the mobile phone during S5*oi*. The raw fingerprint data includes the noisy image data that is generated based on the actual hardware parameters of the touch screen and the fingerprint sensor and that affects the success rate of fingerprint recognition. Therefore, the mobile phone can perform feature fusion on the raw fingerprint data and the preset fingerprint data to reduce the noisy image data in the raw fingerprint data to obtain the first fusion image.

In some embodiments, the method in which the mobile phone performs feature fusion on the raw fingerprint data and the preset fingerprint data to obtain the first fusion image may include S1 and S2. In other words, S503*b* includes S1 and S2.

S1: The mobile phone removes the noisy image data from the raw fingerprint data (that is, the raw data) by using the preset fingerprint data (that is, the base data) to obtain a second fusion image.

For the method in which the mobile phone removes the noisy image data from the raw fingerprint data by using the preset fingerprint data to obtain the second fusion image, refer to the related description in the conventional technology. Details are not described herein.

S2: The mobile phone performs normalization on the second fusion image to obtain the first fusion image.

It should be understood that quality of a fingerprint image captured by the mobile phone is affected not only by hardware parameters of the mobile phone, but also by a user operation and illumination. For example, the second fusion image obtained by performing S1 by the mobile phone may be nonuniform in brightness because the user finger sweats, the user finger does not fit the touch screen sufficiently, ambient light is too strong, and the like. If the user finger does not fit the touch screen sufficiently or the ambient light is too strong, a position that is corresponding to the fingerprint sensor and that is on the touch screen is easily reflected, resulting in nonuniform brightness of the fingerprint image.

In view of this, the mobile phone may perform S2 and perform normalization on the second fusion image to obtain the first fusion image. In this way, brightness of all pixels in the fusion image can be made more uniform. Brightness uniformity of all pixels in the first fusion image is higher than brightness uniformity of all pixels in the second fusion image.

The brightness uniformity of the fingerprint image can be reflected by contrast of the fingerprint image. Stronger contrast of the fingerprint image indicates lower brightness uniformity of the fingerprint image. Weaker contrast of the fingerprint image indicates higher brightness uniformity of the fingerprint image. In this design, normalization can be performed on the second fusion image to reduce the contrast of the second fusion image, thereby improving the brightness uniformity of the second fusion image.

It should be noted that, in the embodiment of the present application, for the method in which the mobile phone performs normalization on a fusion image (for example, the second fusion image) to improve brightness uniformity of the fusion image, reference may be made to the related description in the conventional technology, and details are not described herein in this embodiment of the present application.

S503c. The mobile phone runs a preset AI recognition model with the first fusion image used as input to determine whether the touch screen is in the first state.

The preset AI recognition model is capable of determining, based on a fingerprint image, whether a corresponding touch screen is in the first state. The corresponding touch screen refers to a touch screen in which a fingerprint sensor for capturing the fingerprint image is located.

The preset AI recognition model is pre-configured on the mobile phone. An output result of the preset AI recognition model is used to indicate whether the touch screen is in a screen protector state. For example, the output result of the preset AI recognition model may be first information or second information. The first information is used to indicate that the touch screen is in a screen protector state, and the second information is used to indicate that the touch screen is in a bare screen state. For example, the first information may be "1", and the second information may be "0". Alternatively, the first information may be "10", and the second information may be "00".

For example, the preset AI recognition model may include at least any one of the following network modules: a CNN model or a ResNet model.

It should be noted that the ResNet model described in the embodiments of the present application may be obtained by modifying an existing ResNet model. Specifically, the ResNet model described in the embodiments of the present application may be a model obtained by deleting branches other than a branch for a dichotomous classification function in the ResNet model. The dichotomous classification function refers to an ability to solve a dichotomous classification problem. The dichotomous classification problem has two results: yes (YES) or no (NO). The first information is YES, and the second information is NO.

For example, the embodiment of the present application describes a training process of the preset AI recognition model.

In the embodiment of the present application, the fingerprint sensor of the mobile phone can capture a plurality of fingerprint images a and a plurality of fingerprint images b of a large quantity of users in different usage scenarios. The plurality of fingerprint images a are captured by the fingerprint sensor of the mobile phone when the touch screen of the mobile phone is in the screen protector state. The plurality of fingerprint images b are captured by the fingerprint sensor of the mobile phone when the touch screen of the mobile phone is in the bare screen state. Then, a corresponding fusion image a (that is, a first fusion image) can be obtained from each captured fingerprint image a, and a corresponding fusion image b (that is, a first fusion image) can be obtained from each captured fingerprint image b. In this way, a plurality of screen-protector training samples and a plurality of bare-screen training samples can be obtained. Each screen-protector training sample includes a fusion image a corresponding to a fingerprint image a, and each bare-screen training sample includes a fusion image b corresponding to a fingerprint image b.

Finally, the preset AI recognition model may be trained by using the plurality of screen-protector training samples (that is, the plurality of fusion images a) as input samples, and using the first information as output samples. The preset AI recognition model may be further trained by using the plurality of bare-screen training samples (that is, the plurality of fusion images b) as input samples, and using the second information as output samples. Thus, after a plurality of times of training, the preset AI recognition model is capable of determining, based on a fingerprint image, whether a corresponding touch screen is in a screen protector state.

The different usage scenarios may include a plurality of scenarios in which the mobile phone may be used. For example, the plurality of scenarios may include at least the following usage scenarios: a high-temperature scenario, a low-temperature scenario, a scenario in which ambient light brightness is relatively high, a scenario in which ambient light brightness is relatively low, an indoor scenario, an outdoor scenario, a day scenario, a night scenario, and any other scenarios corresponding to image quality factors that may affect fingerprint images captured by the fingerprint sensor. The large quantity of users may include a plurality of users at different ages, a plurality of users of different genders, a plurality of users in different professions, a plurality of users with different degrees of finger wetness, and the like.

After S503 (or S503c), if the touch screen is in the first state, it indicates that the first fingerprint information does not pass fingerprint recognition because a protective film applied to the touch screen affects quality of a fingerprint image in the first fingerprint information captured by the fingerprint sensor. In this case, the mobile phone may perform S504 of restoring the first fingerprint information by using a first preset AI restoration model, and then perform S505 of performing fingerprint recognition on restored second fingerprint information.

After S503 (or S503c), if the touch screen is in a second state, it indicates that the first fingerprint information does not pass fingerprint recognition, not because a protective film applied to the touch screen affects quality of a fingerprint image in the first fingerprint information captured by the fingerprint sensor, but because something else. The second state is used to indicate that the touch screen is in a bare screen state. In some embodiments, after S503, if the touch screen is in the bare screen state, the mobile phone may perform S509 of indicating a fingerprint recognition failure. In some other embodiments, after S503, if the touch screen is in the bare screen state, the mobile phone may not perform S509, but use another preset AI restoration model (for example, a second preset AI restoration model) to restore the first fingerprint information to obtain third fingerprint information, and then perform fingerprint recognition on the third fingerprint information.

S504. The mobile phone runs the first preset AI restoration model with the first fingerprint information used as input to obtain the second fingerprint information. Quality of a fingerprint image in the second fingerprint information is higher than quality of a fingerprint image in the first fingerprint information.

Figure 10:
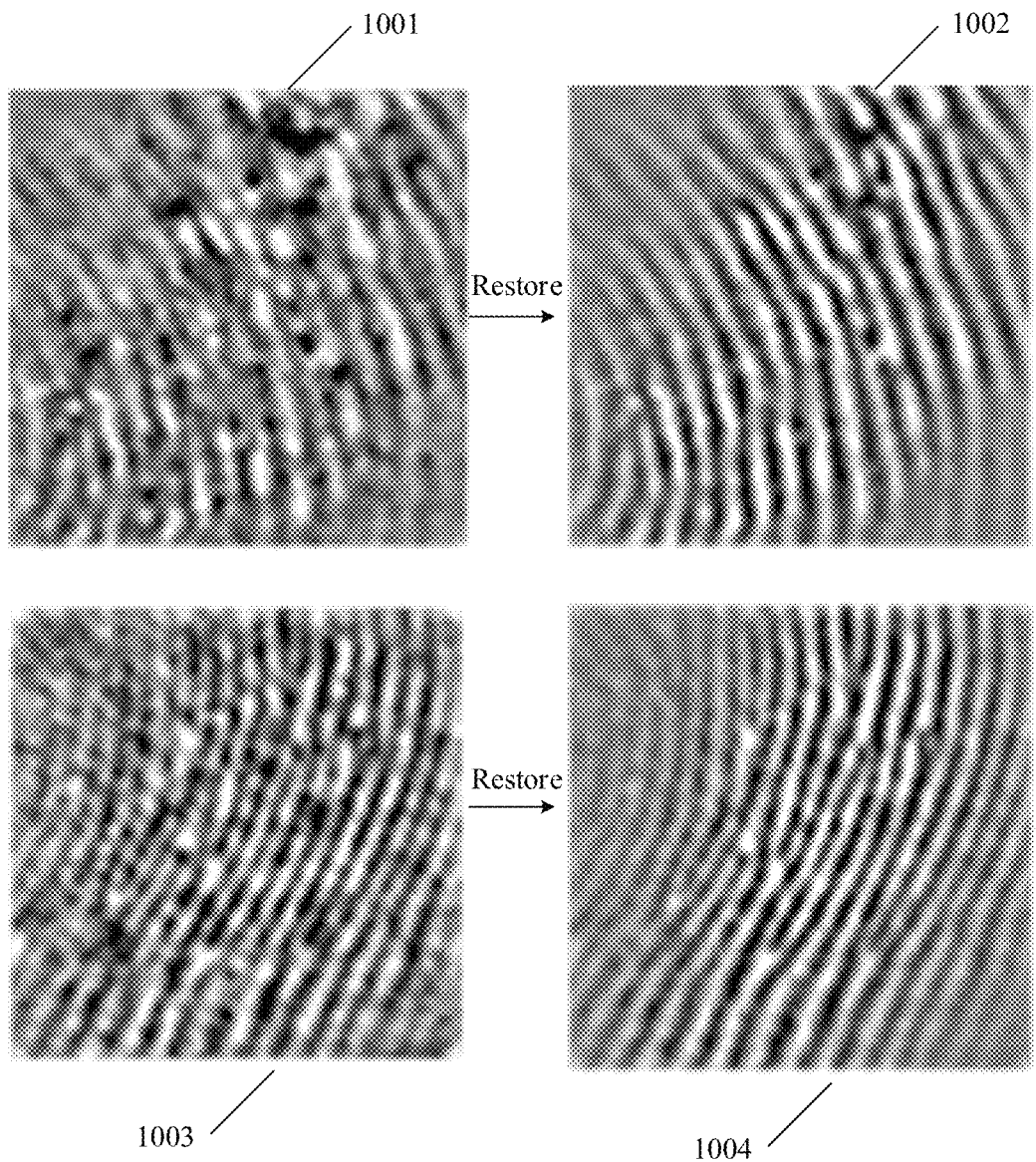
FIG. 10 is a schematic diagram of fingerprint images before and after restoration according to an embodiment of the present application.

For example, a fingerprint image 1001 shown in FIG. 10 is the fingerprint image in the first fingerprint information, and a fingerprint image 1002 shown in FIG. 10 is the fingerprint image in the second fingerprint information. As shown in FIG. 10, quality of the fingerprint image 1002 is higher than quality of the fingerprint image 1001.

The first preset AI restoration model is capable of restoring a fingerprint image to improve image quality. The first preset AI restoration model is pre-configured on the mobile phone. An image before restoration (for example, the first fingerprint information) is input into the first preset AI restoration model, and an image after restoration (for example, the second fingerprint information) is output from the first preset AI restoration model.

The first preset AI restoration model is trained by using a plurality of first groups of fingerprint images as training samples. Each first group of fingerprint images includes a first fingerprint image and a second fingerprint image. The first fingerprint image is captured by the fingerprint sensor when the touch screen is in the screen protector state. The second fingerprint image is an image obtained after the first fingerprint image is restored. The second fingerprint image may be obtained by restoring the first fingerprint image using a pre-configured image restoration tool (for example, an AI model).

For example, the embodiment of the present application describes a training process of the first preset AI restoration model.

In the embodiment of the present application, a plurality of first groups of fingerprint images may be captured, and each first group of fingerprint images includes a first fingerprint image A and a second fingerprint image B. The second fingerprint image B is obtained by restoring the first fingerprint image A using a pre-configured image restoration tool (for example, an AI model). Quality of the second fingerprint image B is higher than quality of the first fingerprint image A in the same group. Then, the first preset AI restoration model may be trained by using the first fingerprint image A in each first group of fingerprint images as an input sample, and using the second fingerprint image B in the first group of fingerprint images as an output sample. Thus, after a plurality of times of training, the first preset AI restoration model is capable of restoring a fingerprint image to improve image quality.

In some embodiments, the first preset AI restoration model may be a fully convolutional network (fully convolutional network, FCN) model. In some other embodiments, the first preset AI restoration model may be a Unet model. Herein, the Unet model is more miniaturized than the FCN model. Thus, the Unet model is more suitable for a small terminal, such as a mobile phone, a tablet computer, or a wearable device.

In some other embodiments, the first preset AI restoration model is a Garbor filter. The Garbor filter is capable of extracting an orientation field image from the first fingerprint information, and restoring the first fingerprint information with the orientation field image to obtain the second fingerprint information. The orientation field image is used to represent directionality of a fingerprint ridge of the fingerprint image in the first fingerprint information.

It should be understood that because the orientation field image is used to represent directionality of a fingerprint ridge of the fingerprint image in the first fingerprint information, the directionality of the fingerprint ridge of the fingerprint image in the first fingerprint information can be determined by using the orientation field image, and intermittent fingerprint points in the first fingerprint information can be connected based on the directionality of the fingerprint ridge of the fingerprint image in the first fingerprint information. Thus, the second fingerprint information whose image quality is higher than image quality of the first fingerprint information can be obtained.

S505. The mobile phone determines whether the second fingerprint information matches the preset fingerprint information.

For a specific method in which the mobile phone determines whether the second fingerprint information matches the preset fingerprint information, or the mobile phone performs fingerprint recognition on the second fingerprint information, refer to the fingerprint recognition method in the foregoing embodiment and the conventional technology. Details are not described herein in this embodiment of the present application.

After S505, if the second fingerprint information passes fingerprint recognition (that is, the second fingerprint information matches the preset fingerprint information), the mobile phone may perform S508. If the second fingerprint information does not pass fingerprint recognition (that is, the second fingerprint information does not match the preset fingerprint information), the mobile phone may perform S509.

S506. The mobile phone runs the second preset AI restoration model with the first fingerprint information used as input to obtain the third fingerprint information. Quality of a fingerprint image in the third fingerprint information is higher than the quality of the fingerprint image in the first fingerprint information.

For example, a fingerprint image 1003 shown in FIG. 10 is the fingerprint image in the first fingerprint information, and a fingerprint image 1004 shown in FIG. 10 is the fingerprint image in the third fingerprint information. As shown in FIG. 10, quality of the fingerprint image 1004 is higher than quality of the fingerprint image 1003.

The second preset AI restoration model is capable of restoring a fingerprint image to improve image quality. The second preset AI restoration model is pre-configured on the mobile phone. An image before restoration (for example, the first fingerprint information) is input into the second preset AI restoration model, and an image after restoration (for example, the third fingerprint information) is output from the second preset AI restoration model.

The second preset AI restoration model is trained by using a plurality of second groups of fingerprint images as training samples. Each second group of fingerprint images includes a third fingerprint image and a fourth fingerprint image. The third fingerprint image is captured by the fingerprint sensor when the touch screen is in the bare screen state. The fourth fingerprint image is an image obtained after the third fingerprint image is restored. The fourth fingerprint image may be obtained by restoring the third fingerprint image using a pre-configured image restoration tool (for example, an AI model).

For example, the embodiment of the present application describes a training process of the second preset AI restoration model.

In the embodiment of the present application, a plurality of second groups of fingerprint images may be captured, and each second group of fingerprint images includes a third fingerprint image C and a fourth fingerprint image D. The fourth fingerprint image D is obtained by restoring the third fingerprint image C using a pre-configured image restoration tool (for example, an AI model). Quality of the fourth fingerprint image D is higher than quality of the third fingerprint image C in the same group. Then, the second preset AI restoration model may be trained by using the third fingerprint image C in each second group of fingerprint images as an input sample, and using the fourth fingerprint image D in the second group of fingerprint images as an output sample. Thus, after a plurality of times of training, the second preset AI restoration model is capable of restoring a fingerprint image to improve image quality.

In some embodiments, the second preset AI restoration model may be an FCN model. In some other embodiments, the second preset AI restoration model may be a Unet model.

In some other embodiments, the second preset AI restoration model is a Garbor filter. The Garbor filter is capable of extracting an orientation field image from the first fingerprint information, and restoring the first fingerprint information with the orientation field image to obtain the third fingerprint information. The orientation field image is used to represent directionality of a fingerprint ridge of the fingerprint image in the first fingerprint information.

It should be understood that because the orientation field image is used to represent directionality of a fingerprint ridge of the fingerprint image in the first fingerprint information, the directionality of the fingerprint ridge of the fingerprint image in the first fingerprint information can be determined by using the orientation field image, and intermittent fingerprint points in the first fingerprint information can be connected based on the directionality of the fingerprint ridge of the fingerprint image in the first fingerprint information. Thus, the third fingerprint information whose image quality is higher than image quality of the first fingerprint information can be obtained.

It should be noted that the first preset AI restoration model and the second preset AI restoration model are trained by using different training samples. Specifically, the first preset AI restoration model is trained by using the plurality of first groups of fingerprint images as training samples, while the second preset AI restoration model is trained by using the plurality of second groups of fingerprint images as training samples. Each first group of fingerprint images includes a first fingerprint image captured by the fingerprint sensor when the touch screen is in the screen protector state, and a second fingerprint image obtained by restoring the first fingerprint image. Each second group of fingerprint images includes a third fingerprint image captured by the fingerprint sensor when the touch screen is in the bare screen state, and a fourth fingerprint image obtained by restoring the third fingerprint image.

In other words, the first preset AI restoration model is trained by using the fingerprint images captured by the fingerprint sensor when the touch screen is in the screen protector state, while the second preset AI restoration model is trained by using the fingerprint images captured by the fingerprint sensor when the touch screen is in the bare screen state. Therefore, the first preset AI restoration model has a better effect of restoring a fingerprint image captured in the screen protector state, while the second preset AI model has a better effect of restoring a fingerprint image captured in the bare screen state.

According to the method in the embodiment of the present application, if fingerprint recognition is performed, the mobile phone can use different AI restoration models to restore fingerprint images captured by the fingerprint sensor when the touch screen is in different states (such as a screen protector state or a bare screen state), so as to improve quality of the fingerprint images. In this way, when the touch screen is in different states, quality of the fingerprint images can be improved accordingly, so that the success rate of fingerprint recognition can be increased.

S507. The mobile phone determines whether the third fingerprint information matches the preset fingerprint information.

For a specific method in which the mobile phone determines whether the third fingerprint information matches the preset fingerprint information, or the mobile phone performs fingerprint recognition on the third fingerprint information, refer to the fingerprint recognition method in the conventional technology. Details are not described herein in this embodiment of the present application.

After S509, if the third fingerprint information passes fingerprint recognition (that is, the third fingerprint information matches the preset fingerprint information), the mobile phone may perform S508. If the third fingerprint information does not pass fingerprint recognition (that is, the third fingerprint information does not match the preset fingerprint information), the mobile phone may perform S509.

S508: The mobile phone displays the second interface. The second interface is an interface displayed on the mobile phone after the fingerprint recognition is passed at the first interface.

Figure 6C:
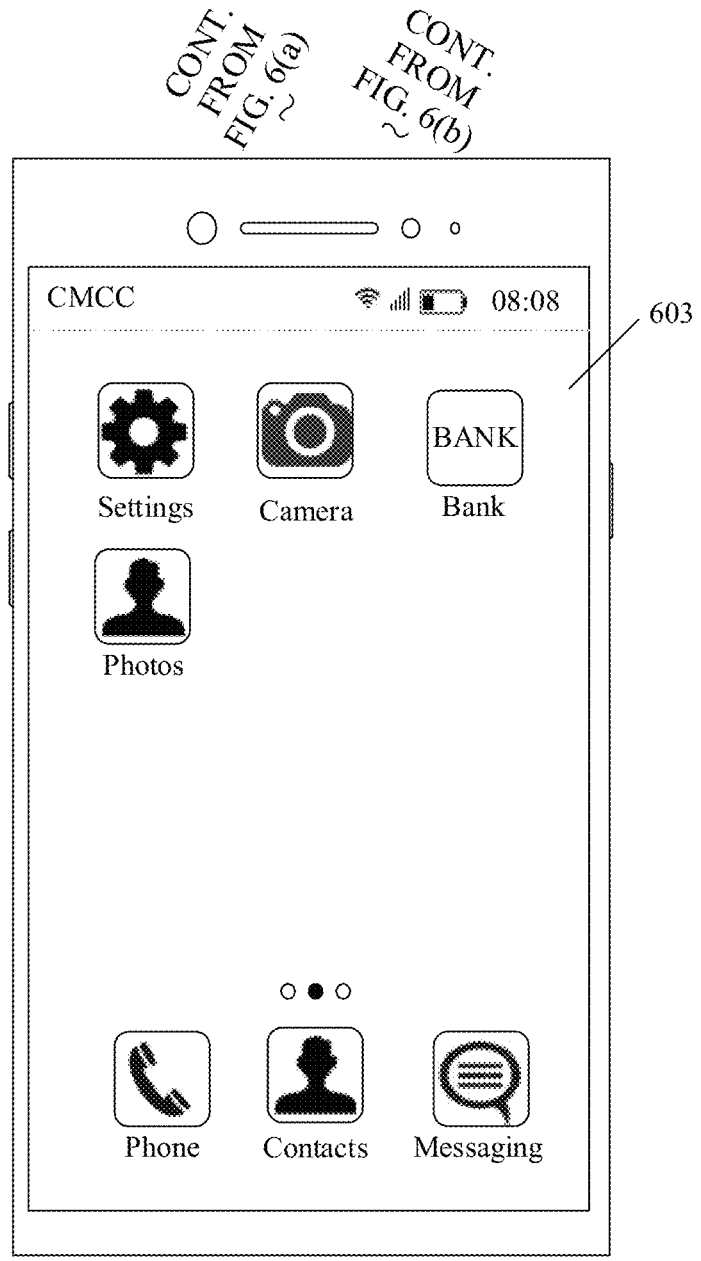

For example, in the foregoing first application scenario, the second interface may be the main interface 603 shown in FIG. 6(c). For another example, in the foregoing second application scenario, the second interface may be the payment success interface 702 shown in FIG. 7(b). For another example, in the foregoing third application scenario, the second interface may be the account detail page 804 of the "bank" application.

S509: The mobile phone displays the third interface. The third interface includes prompt information indicating a fingerprint recognition failure.

For a method in which the mobile phone sends the prompt information indicating that the fingerprint recognition is not passed (that is, the fingerprint recognition failure), refer to the related description in the conventional technology. Details are not described herein.

Figure 11:
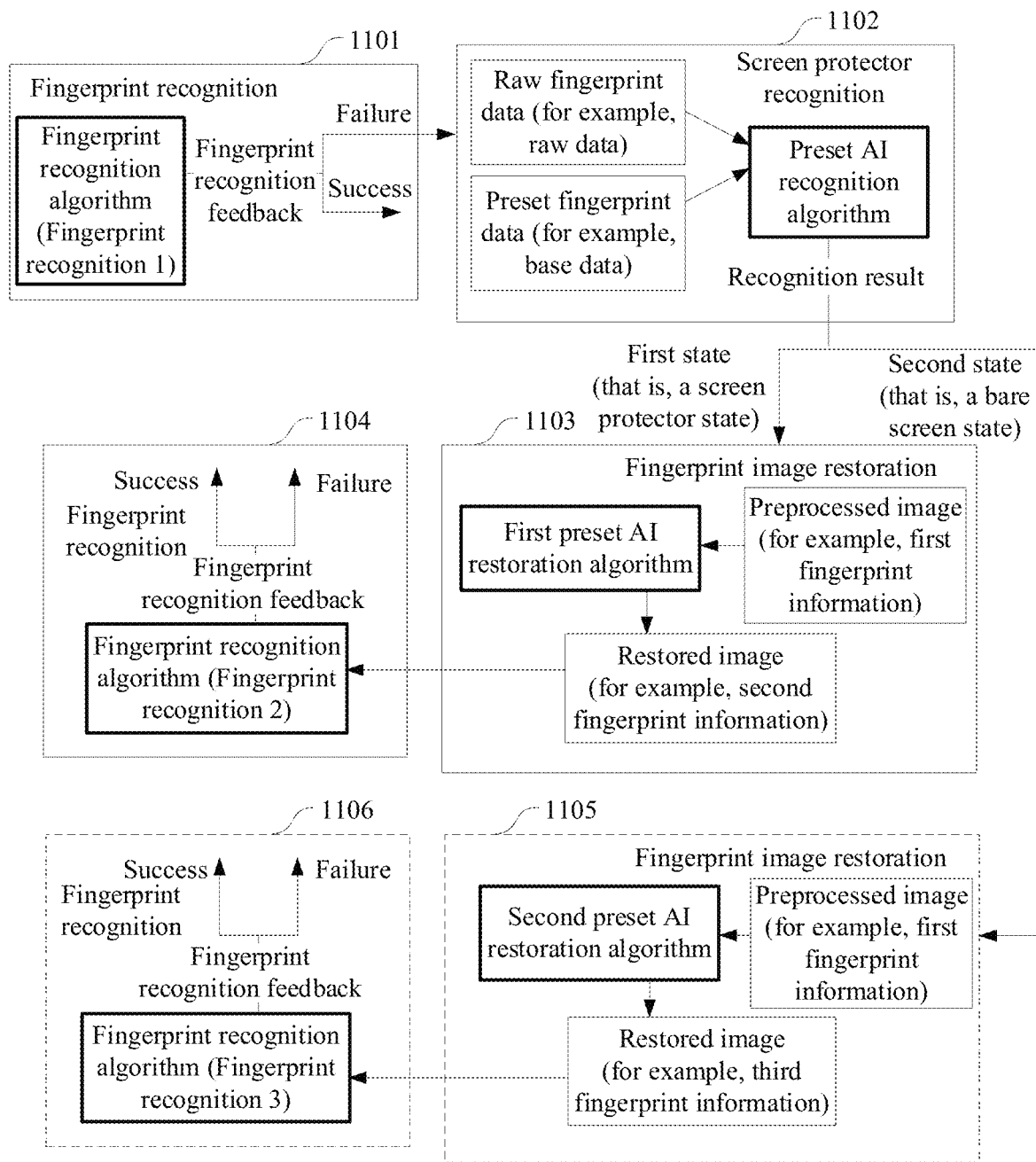
FIG. 11 is a schematic flowchart of a principle of another fingerprint recognition method according to an embodiment of the present application.

For example, FIG. 11 is a schematic diagram of a principle of a fingerprint recognition method according to an embodiment of the present application. The mobile phone may perform fingerprint recognition 1101 shown in FIG. 11, and perform fingerprint recognition 1 on first fingerprint information by using a fingerprint recognition algorithm to obtain a fingerprint recognition feedback (that is, a fingerprint recognition result). The fingerprint recognition feedback may be a fingerprint recognition failure or success. Herein, 1101 shown in FIG. 11 corresponds to S502.

After 1101 shown in FIG. 11, if the fingerprint recognition succeeds (that is, the fingerprint recognition passes), the mobile phone may display a second interface. The second interface is an interface displayed on the mobile phone after the fingerprint recognition is passed at the first interface.

After 1101 shown in FIG. 11, if the fingerprint recognition fails (that is, the fingerprint recognition is not passed), the mobile phone may perform screen protector recognition 1102 shown in FIG. 11 of fusing raw fingerprint data (for example, the raw data) and preset fingerprint data (for example, the base data) to obtain a fusion image (that is, a first fusion image), and using a preset AI recognition algorithm by using the fusion image as data to obtain a recognition result. The recognition result is used to indicate whether the touch screen of the mobile phone is in a screen protector state. It should be understood that the preset AI recognition algorithm is an algorithm used by the preset AI recognition model for screen protector recognition. Herein, 1102 shown in FIG. 11 corresponds to S503.

After 1102 shown in FIG. 11, if the touch screen of the mobile phone is in the screen protector state, the mobile phone may perform 1103 shown in FIG. 11 of restoring a preprocessed image (for example, the first fingerprint information) by using a first preset AI restoration algorithm to obtain a restored image (for example, second fingerprint information). It should be understood that the first preset AI restoration algorithm is an algorithm used by the first preset AI restoration model to perform image restoration. Herein, 1103 shown in FIG. 11 corresponds to S504.

After 1103 shown in FIG. 11, the mobile phone may perform 1104 shown in FIG. 11 of performing fingerprint recognition 2 on a restored image (for example, the second fingerprint information) by using a fingerprint recognition algorithm to obtain a fingerprint recognition feedback (that is, a fingerprint recognition result). The fingerprint recognition feedback may be a fingerprint recognition failure or success. Herein, 1104 shown in FIG. 11 corresponds to S505.

After 1102 shown in FIG. 11, if the touch screen of the mobile phone is in the bare screen state, the mobile phone may perform 1105 shown in FIG. 11 of restoring the preprocessed image (for example, the first fingerprint information) by using a second preset AI restoration algorithm to obtain a restored image (for example, third fingerprint information). It should be understood that the second preset AI restoration algorithm is an algorithm used by the second preset AI restoration model to perform image restoration. Herein, 1105 shown in FIG. 11 corresponds to S506.

After 1105 shown in FIG. 11, the mobile phone may perform 1106 shown in FIG. 11 of performing fingerprint recognition 3 on a restored image (for example, the third fingerprint information) by using a fingerprint recognition algorithm to obtain a fingerprint recognition feedback (for example, a fingerprint recognition result). The fingerprint recognition feedback may be a fingerprint recognition failure or success. Herein, 1106 shown in FIG. 11 corresponds to S507.

As can be seen from the above description, the mobile phone performs the screen protector recognition 1102 to perform image fusion on the raw fingerprint data (for example, the raw data) and the preset fingerprint data (for example, the base data). In this way, the noisy image data in the raw fingerprint data can be reduced.

In some other embodiments, the mobile phone may also normalize the fusion image to increase brightness uniformity of all pixels in the fusion image. For example, S503*b* may include S1 and S2.

Figure 12:
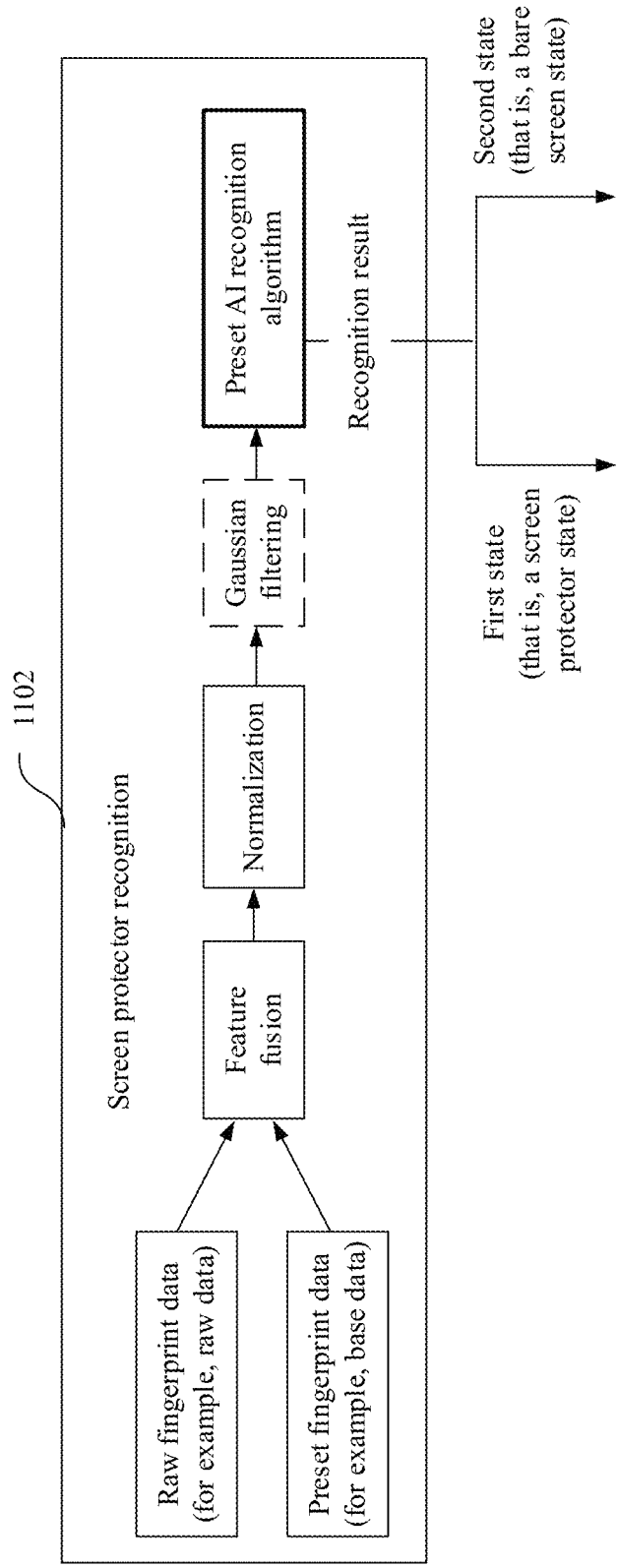
FIG. 12 is a schematic flowchart of a principle of another fingerprint recognition method according to an embodiment of the present application.

In some other embodiments, after image fusion is performed on the raw fingerprint data (for example, the raw data) and the preset fingerprint data (for example, the base data), only part of the noisy image data can be removed from the raw fingerprint data, and some Gaussian noise cannot be removed by image fusion. In view of this, in the embodiment of the present application, as shown in FIG. 12, the mobile phone may perform normalization on the fusion image, and then perform Gaussian filtering on the normalized image. Specifically, S503*b* may include S-a, S-b, and S-c.

S-a: The mobile phone removes noisy image data from the raw fingerprint data (for example, the raw data) by using the preset fingerprint data (for example, the base data) to obtain a second fusion image.

For detailed description of S-a, refer to the introduction to S1 in the foregoing embodiment. Details are not described herein again in this embodiment of the present application.

S-b: The mobile phone performs normalization on the second fusion image to obtain a third fusion image.

For detailed description of S-b, refer to the introduction to S2 in the foregoing embodiment. Details are not described herein again in this embodiment of the present application.

S-c: The mobile phone performs Gaussian filtering on the third fusion image to obtain the first fusion image.

The mobile phone may perform S-c to filter out the Gaussian noise in the third fusion image to obtain the first fusion image. In the embodiment of the present application, for a method in which the mobile phone performs Gaussian filtering on a fusion image (for example, the third fusion image), refer to the related description in the conventional technology. Details are not described herein in the embodiment of the present application.

Figure 13:
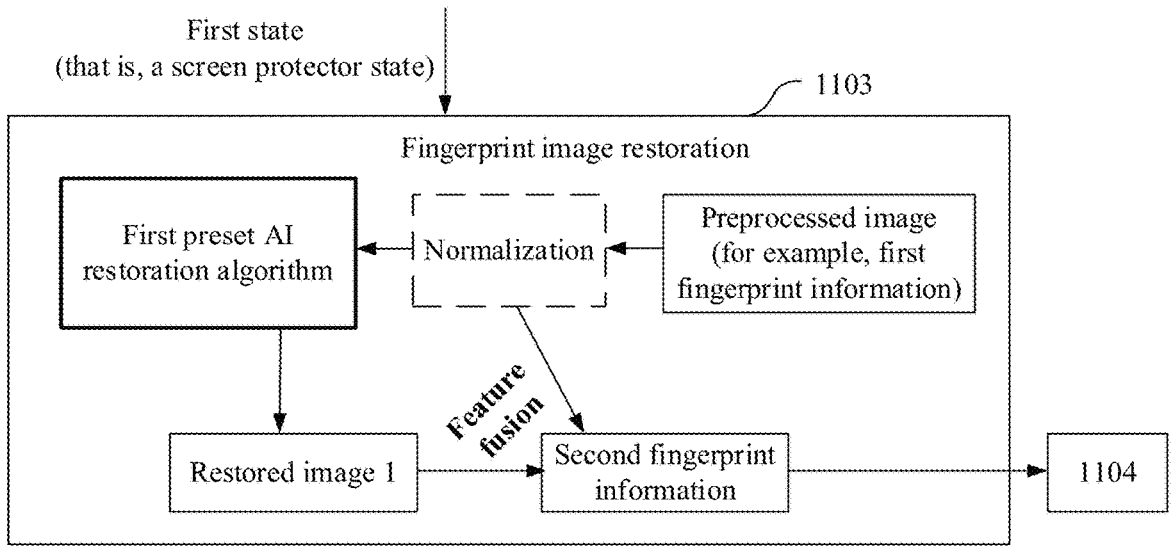
FIG. 13 is a schematic flowchart of a principle of another fingerprint recognition method according to an embodiment of the present application.

In some other embodiments, to further increase the success rate of fingerprint recognition, as shown in FIG. 13, 1103 may further include that the mobile phone performs normalization on the preprocessed image (for example, the first fingerprint information). The normalization of the first fingerprint information can improve brightness uniformity of all pixels in the fingerprint image in the first fingerprint information. Then, as shown in FIG. 13, the mobile phone may run the first preset AI restoration model with the normalized first fingerprint information used as input to obtain a restored image 1. Finally, as shown in FIG. 13, the mobile phone may perform image fusion on the normalized first fingerprint information and the restored image 1 to obtain the second fingerprint image. Image fusion is performed on the normalized first fingerprint information and the restored image 1 to obtain a fingerprint image with a clearer texture and fewer intermittent points. In other words, compared with the restored image 1, the second fingerprint image obtained after fusion has a clearer texture and fewer intermittent points. In this way, the success rate of fingerprint recognition is higher for the second fingerprint image obtained after fusion.

Figure 14:
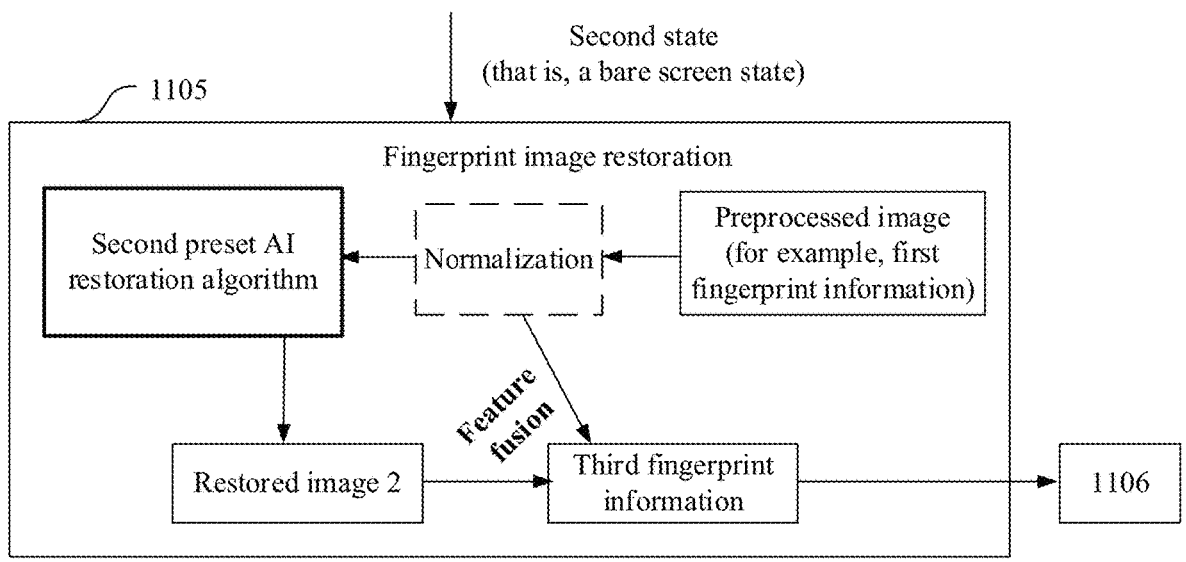
FIG. 14 is a schematic flowchart of a principle of another fingerprint recognition method according to an embodiment of the present application.

In some other embodiments, to further increase the success rate of fingerprint recognition, as shown in FIG. 14, 1105 may further include that the mobile phone performs normalization on the preprocessed image (for example, the first fingerprint information). The normalization of the first fingerprint information can improve brightness uniformity of all pixels in the fingerprint image in the first fingerprint information. Then, as shown in FIG. 14, the mobile phone may run the second preset AI restoration model with the normalized first fingerprint information used as input to obtain a restored image 2. Finally, as shown in FIG. 14, the mobile phone may perform image fusion on the normalized first fingerprint information and the restored image 2 to obtain a third fingerprint image. Image fusion is performed on the normalized first fingerprint information and the restored image 2 to obtain a fingerprint image with a clearer texture and fewer intermittent points. In other words, compared with the restored image 2, the third fingerprint image obtained after fusion has a clearer texture and fewer intermittent points. In this way, the success rate of fingerprint recognition is higher for the third fingerprint image obtained after fusion.

An embodiment of the present application provides an electronic device, and the electronic device may include: the foregoing touch screen, a memory, and one or more processors. The electronic device may also include a fingerprint sensor. The fingerprint sensor and the touch screen can provide an in-screen fingerprint function. The touch screen, the fingerprint sensor, and the memory are coupled to the processor. The memory is configured to store computer program code, and the computer program code includes computer instructions. When the processor executes the computer instructions, the electronic device can perform the functions or steps performed by the mobile phone in the foregoing method embodiments. For a structure of the electronic device, refer to the structure of the electronic device 100 in FIG. 3.

An embodiment of the present application further provides a computer storage medium. The computer storage medium includes computer instructions. When the computer instructions are run on an electronic device, the electronic device is enabled to perform the functions or steps performed by the mobile phone in the foregoing method embodiments.

An embodiment of the present application further provides a computer program product. When the computer program product is run on a computer, the computer is enabled to perform the functions or steps performed by the mobile phone in the foregoing method embodiments.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above.

In the embodiments provided in the present application, it should be understood that the disclosed apparatus and method may be implemented in another manner. For example, the described apparatus embodiment is only an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one physical unit or a plurality of physical units, that is, may be located in one place, or may be distributed in a plurality of different places. Some or all of the units may be selected based on actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of the present application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of the present application, but is not intended to limit the protection scope of the present application. Any variation or replacement made within the technical scope disclosed in the present application shall fall within the protection scope of the present application. Therefore, the protection scope of the present application shall be subject to the protection scope of the claims.

What is claimed is:

1. A method, comprising:
   displaying, by an electronic device, a first interface, the electronic device comprising a touch screen and a fingerprint sensor;
   capturing, by the electronic device, first fingerprint information that is input by a user at the first interface;
   determining, by the electronic device, that the touch screen is in a first state based on that the first fingerprint information mismatches preset fingerprint information such that the first fingerprint information fails fingerprint recognition, wherein the first state indicates that the touch screen is in a screen protector state, and wherein the determining that the touch screen is in the first state comprises:
      obtaining, by the electronic device, raw fingerprint data for the first fingerprint information and obtaining preset fingerprint data;
      performing, by the electronic device, feature fusion on the raw fingerprint data and the preset fingerprint data to obtain a first fusion image; and
      running, by the electronic device, a preset AI recognition model with the first fusion image used as input to determine that the touch screen is in the first state, wherein the performing the feature fusion on the raw fingerprint data and the preset fingerprint data to obtain the first fusion image comprises:
      removing, by the electronic device, noisy image data from the raw fingerprint data by using the preset fingerprint data to obtain a second fusion image; and
      performing, by the electronic device, normalization on the second fusion image to obtain the first fusion image, wherein first brightness uniformity of all pixels in the first fusion image is higher than second brightness uniformity of all pixels in the second fusion image; or performing, by the electronic device, the normalization on the second fusion image to obtain a third fusion image, wherein third brightness uniformity of all pixels in the third fusion image is higher than the second brightness uniformity of all pixels in the second fusion image;
   restoring, by the electronic device based on that the touch screen is in the first state, the first fingerprint information by using a first preset artificial intelligence (AI) restoration model to obtain second fingerprint information, wherein an input of the first preset AI restoration model is the first fingerprint information including a first fingerprint image, wherein an output of the first preset AI restoration model is the second fingerprint information including a second fingerprint image, wherein second quality of the second fingerprint image in the second fingerprint information is higher than first quality of the first fingerprint image in the first fingerprint information, wherein the preset AI recognition model and the first preset AI restoration model are different types of AI models outputting different types of data, and wherein the electronic device performs the capturing the first fingerprint information, the determining that the touch screen is in the first state, and the restoring the first fingerprint information while the touch screen of the electronic device is protected by a same protective film;

determining, by the electronic device, that the second fingerprint information matches the preset fingerprint information; and displaying, by the electronic device, a second interface.

2. The method according to claim 1, wherein the method further comprises:
before the determining, by the electronic device, that the touch screen is in the first state:
displaying, by the electronic device, a third interface, wherein the third interface comprises prompt information indicating a fingerprint recognition failure.

3. The method according to claim 1, wherein the method further comprises:
after the determining, by the electronic device, that the touch screen is in the first state,
restoring, by the electronic device based on that the touch screen is in a second state, the first fingerprint information by using a second preset AI restoration model to obtain third fingerprint information, wherein the second state indicates that the touch screen is in a bare screen state, and third quality of a third fingerprint image in the third fingerprint information is higher than the first quality of the first fingerprint image in the first fingerprint information; and
determining, by the electronic device, that the third fingerprint information matches the preset fingerprint information; and
displaying the second interface,
wherein the first preset AI restoration model is different from the second preset AI restoration model.

4. The method according to claim 3, wherein the restoring, by the electronic device, the first fingerprint information by using the second preset AI restoration model to obtain the third fingerprint information comprises:
running, by the electronic device, the second preset AI restoration model with the first fingerprint information used as input to obtain the third fingerprint information,
wherein the second preset AI restoration model is trained by using a plurality of second groups of fingerprint images as training samples, each second group of the plurality of second groups of fingerprint images comprises a third corresponding fingerprint image and a fourth corresponding fingerprint image, the third corresponding fingerprint image is captured when the touch screen is in the second state, and the fourth corresponding fingerprint image is a pre-configured image obtained after the third fingerprint image is restored.

5. The method according to claim 4,
wherein the second preset AI restoration model is an FCN model, or
wherein the second preset AI restoration model is a Unet model, or
wherein the second preset AI restoration model is a Garbor filter.

6. The method according to claim 1, wherein the first interface comprises at least one of:
an interface in which the electronic device is in a lock screen state, a fingerprint payment interface of the electronic device, or a fingerprint unlocking interface for one or more functions of a first application on the electronic device.

7. The method according to claim 1, wherein the performing, by the electronic device, the feature fusion on the raw fingerprint data and the preset fingerprint data to obtain the first fusion image further comprises:
performing, by the electronic device, Gaussian filtering on the third fusion image to obtain the first fusion image, wherein the first fusion image does not comprise Gaussian noise in the third fusion image.

8. The method according to claim 1, wherein the preset AI recognition model comprises a convolutional neural network (CNN) model or a residual neural network (ResNet) model.

9. The method according to claim 1, wherein the restoring, by the electronic device, the first fingerprint information by using the first preset AI restoration model to obtain the second fingerprint information comprises:
running, by the electronic device, the first preset AI restoration model with the first fingerprint information used as input to obtain the second fingerprint information,
wherein the first preset AI restoration model is trained by using a plurality of first groups of fingerprint images as training samples, each first group of the plurality of first groups of fingerprint images comprises a first corresponding fingerprint image and a second corresponding fingerprint image, the first corresponding fingerprint image is captured when the touch screen is in the first state, and the second corresponding fingerprint image is a pre-configured image obtained after the first fingerprint image is restored.

10. The method according to claim 9,
wherein the first preset AI restoration model is a fully convolutional network (FCN) model, or
wherein the first preset AI restoration model is a Unet model, or
wherein the first preset AI restoration model is a Garbor filter.

11. The method of claim 1,
wherein the preset AI recognition is trained using a plurality of screen-protector training samples and a plurality of bare-screen training samples, wherein each screen-protector training sample includes a corresponding fusion image obtained from a corresponding fingerprint image captured when the touch screen is in the screen protector state, and each bare-screen training sample includes a corresponding fusion image obtained from a corresponding fingerprint image captured when the touch screen is in a bare screen state,
the plurality of screen-protector training samples including a first set of screen-protector training samples corresponding to a high temperature scenario, a second set of screen-protector training samples corresponding to a low temperature scenario, a third set of screen-protector training samples corresponding to a high ambient light brightness scenario, a fourth set of screen-protector training samples corresponding to a low ambient light brightness scenario, a fifth set of screen-protector training samples corresponding to an indoor scenario, a sixth set of screen-protector training samples corresponding to an outdoor scenario, a seventh set of screen-protector training samples corresponding to a day scenario, and an eighth set of screen-protector training samples corresponding to a night scenario, and wherein the second fingerprint image in the second fingerprint information has higher sharpness and completeness than the first fingerprint image in the first fingerprint information.

12. An electronic device, comprising:
a touch screen;
a fingerprint sensor;
a memory; and
one or more processors, wherein the touch screen, the memory, and the fingerprint sensor are coupled to the one or more processors, the memory stores computer program code, the computer program code comprises computer instructions, and when the computer instructions are executed by the one or more processors, the electronic device is enabled to perform operations including:
displaying a first interface;
capturing first fingerprint information that is input by a user at the first interface;
determining that the touch screen is in a first state based on that the first fingerprint information mismatches preset fingerprint information such that the first fingerprint information fails fingerprint recognition, wherein the first state indicates that the touch screen is in a screen protector state, and wherein the determining that the touch screen is in the first state comprises:
obtaining raw fingerprint data for the first fingerprint information and obtaining preset fingerprint data;
performing feature fusion on the raw fingerprint data and the preset fingerprint data to obtain a first fusion image; and
running a preset AI recognition model with the first fusion image used as input to determine that the touch screen is in the first state, wherein the performing the feature fusion on the raw fingerprint data and the preset fingerprint data to obtain the first fusion image comprises:
removing noisy image data from the raw fingerprint data by using the preset fingerprint data to obtain a second fusion image; and
performing normalization on the second fusion image to obtain the first fusion image, wherein first brightness uniformity of all pixels in the first fusion image is higher than second brightness uniformity of all pixels in the second fusion image; or performing, by the electronic device, the normalization on the second fusion image to obtain a third fusion image, wherein third brightness uniformity of all pixels in the third fusion image is higher than the second brightness uniformity of all pixels in the second fusion image;
restoring, based on that the touch screen is in the first state, the first fingerprint information by using a first preset artificial intelligence (AI) restoration model to obtain second fingerprint information, wherein an input of the first preset AI restoration model is the first fingerprint information including a first fingerprint image, wherein an output of the first preset AI restoration model is the second fingerprint information including a second fingerprint image, wherein second quality of the second fingerprint image in the second fingerprint information is higher than first quality of the first fingerprint image in the first fingerprint information,
wherein the preset AI recognition model and the first preset AI restoration model are different types of AI models outputting different types of data, and
wherein the electronic device performs the capturing the first fingerprint information, the determining that the touch screen is in the first state, and the restoring the first fingerprint information while the touch screen of the electronic device is protected by a same protective film;
determining that the second fingerprint information matches the preset fingerprint information; and
displaying a second interface.

13. The electronic device according to claim 12, the operations further comprising:
before the determining that the touch screen is in the first state:
displaying a third interface, wherein the third interface comprises prompt information indicating a fingerprint recognition failure.

14. The electronic device according to claim 12, the operations further comprising:
after the determining that the touch screen is in the first state,
restoring, based on that the touch screen is in a second state, the first fingerprint information by using a second preset AI restoration model to obtain third fingerprint information, wherein the second state indicates that the touch screen is in a bare screen state, and third quality of a third fingerprint image in the third fingerprint information is higher than the first quality of the first fingerprint image in the first fingerprint information; and
determining that the third fingerprint information matches the preset fingerprint information; and
displaying the second interface,
wherein the first preset AI restoration model is different from the second preset AI restoration model.

15. The electronic device according to claim 12, wherein the first interface comprises at least one of:
an interface in which the electronic device is in a lock screen state, a fingerprint payment interface of the electronic device, or a fingerprint unlocking interface for one or more functions of a first application on the electronic device.

16. The electronic device according to claim 12, wherein the performing the feature fusion on the raw fingerprint data and the preset fingerprint data to obtain the first fusion image further comprises:
performing Gaussian filtering on the third fusion image to obtain the first fusion image, wherein the first fusion image does not comprise Gaussian noise in the third fusion image.

17. A non-transitory computer-readable storage medium, comprising computer instructions, wherein when the computer instructions are run on an electronic device, the electronic device is enabled to perform operations including:
displaying a first interface, the electronic device comprising a touch screen and a fingerprint sensor;
capturing first fingerprint information that is input by a user at the first interface;

determining that the touch screen is in a first state based on that the first fingerprint information mismatches preset fingerprint information such that the first fingerprint information fails fingerprint recognition, wherein the first state indicates that the touch screen is in a screen protector state, and wherein the determining that the touch screen is in the first state comprises:
obtaining raw fingerprint data for the first fingerprint information and obtaining preset fingerprint data;
performing feature fusion on the raw fingerprint data and the preset fingerprint data to obtain a first fusion image; and
running a preset AI recognition model with the first fusion image used as input to determine that the touch screen is in the first state, wherein the performing the feature fusion on the raw fingerprint data and the preset fingerprint data to obtain the first fusion image comprises:
removing noisy image data from the raw fingerprint data by using the preset fingerprint data to obtain a second fusion image; and
performing normalization on the second fusion image to obtain the first fusion image, wherein first brightness uniformity of all pixels in the first fusion image is higher than second brightness uniformity of all pixels in the second fusion image; or performing, by the electronic device, the normalization on the second fusion image to obtain a third fusion image, wherein third brightness uniformity of all pixels in the third fusion image is higher than the second brightness uniformity of all pixels in the second fusion image;
restoring, based on that the touch screen is in the first state, the first fingerprint information by using a first preset artificial intelligence (AI) restoration model to obtain second fingerprint information, wherein an input of the first preset AI restoration model is the first fingerprint information including a first fingerprint image, wherein an output of the first preset AI restoration model is the second fingerprint information including a second fingerprint image, wherein second quality of the second fingerprint image in the second fingerprint information is higher than first quality of the first fingerprint image in the first fingerprint information,
wherein the preset AI recognition model and the first preset AI restoration model are different types of AI models outputting different types of data, and
wherein the electronic device performs the capturing the first fingerprint information, the determining that the touch screen is in the first state, and the restoring the first fingerprint information while the touch screen of the electronic device is protected by a same protective film;
determining that the second fingerprint information matches preset fingerprint information; and
displaying a second interface.

* * * * *

UNITED STATES PATENT AND TRADEMARK OFFICE
CERTIFICATE OF CORRECTION

PATENT NO. : 12,175,791 B2
APPLICATION NO. : 18/029799
DATED : December 24, 2024
INVENTOR(S) : Di et al.

Page 1 of 1

It is certified that error appears in the above-identified patent and that said Letters Patent is hereby corrected as shown below:

On the Title Page

Item (30), in Column 1, under "Foreign Application Priority Data", Line 1, delete "20110363678.6" and insert -- 202110363678.6 --.

Signed and Sealed this
Eleventh Day of February, 2025

Coke Morgan Stewart
*Acting Director of the United States Patent and Trademark Office*